(12) United States Patent
Allen

(10) Patent No.: US 9,600,799 B1
(45) Date of Patent: Mar. 21, 2017

(54) SYSTEM FOR TIRE STORAGE, RETRIEVAL, AND INVENTORY MANAGEMENT

(71) Applicant: Thomas J. Allen, Olympia, WA (US)

(72) Inventor: Thomas J. Allen, Olympia, WA (US)

( * ) Notice: Subject to any disclaimer, the term of this patent is extended or adjusted under 35 U.S.C. 154(b) by 0 days.

(21) Appl. No.: 15/263,188

(22) Filed: Sep. 12, 2016

Related U.S. Application Data

(63) Continuation of application No. 15/087,849, filed on Mar. 31, 2016, now Pat. No. 9,466,047.

(51) Int. Cl.
| | | |
|---|---|---|
| *G06F 7/00* | (2006.01) | |
| *G06Q 10/08* | (2012.01) | |
| *B65G 1/137* | (2006.01) | |

(52) U.S. Cl.
CPC ......... *G06Q 10/087* (2013.01); *B65G 1/1373* (2013.01)

(58) Field of Classification Search
USPC ........................................................ 700/214
See application file for complete search history.

(56) References Cited

U.S. PATENT DOCUMENTS

| | | | | |
|---|---|---|---|---|
| 6,315,513 B1* | 11/2001 | Harukawa | ............... | B65G 61/00 414/281 |
| 6,362,443 B1* | 3/2002 | Kinoshita | .......... | B29D 30/0016 209/574 |
| 7,819,260 B2* | 10/2010 | Leimbach | .......... | B29D 30/0016 211/24 |
| 8,006,824 B2* | 8/2011 | Wada | ..................... | B65G 61/00 198/347.1 |
| 8,180,483 B2* | 5/2012 | Wada | ....................... | B65G 1/04 198/341.01 |
| 2001/0028838 A1* | 10/2001 | Leimbach | .......... | B29D 30/0016 414/788 |
| 2006/0088405 A1* | 4/2006 | Leimbach | .......... | B29D 30/0016 414/801 |
| 2012/0027558 A1* | 2/2012 | Weeden | ............... | A47B 81/007 414/800 |

* cited by examiner

*Primary Examiner* — Kyle Logan
(74) *Attorney, Agent, or Firm* — Lowe Graham Jones PLLC

(57) ABSTRACT

A storage array includes one or more tier including a plurality of roller pairs and at least one motor for spinning each roller pair. Plates are positioned between each roller pair. A horizontal nudger is positioned above each plate moves tires horizontally within the storage array. A tire is moved longitudinally within the storage array by causing a roller pair bearing the tire to spin followed by lifting the plate below the tire, thereby causing the tire to roll forward or backward within the storage array. A controller coupled to actuators for the plates and the horizontal nudger invokes movement of tires in and out of the storage array and within the storage array according to a storage, retrieval, and inventory management program. Tires may include electronically readable chips that are detected by sensors at a front edge of the storage array that are coupled to the controller.

20 Claims, 17 Drawing Sheets

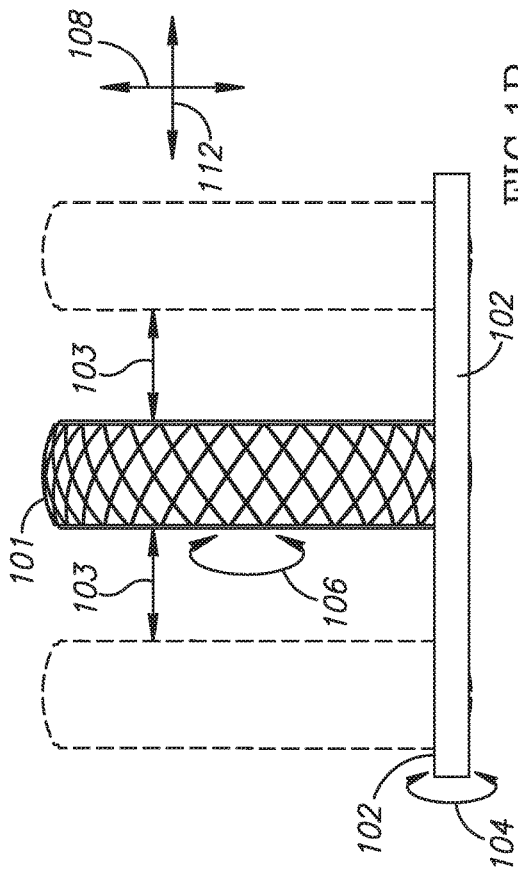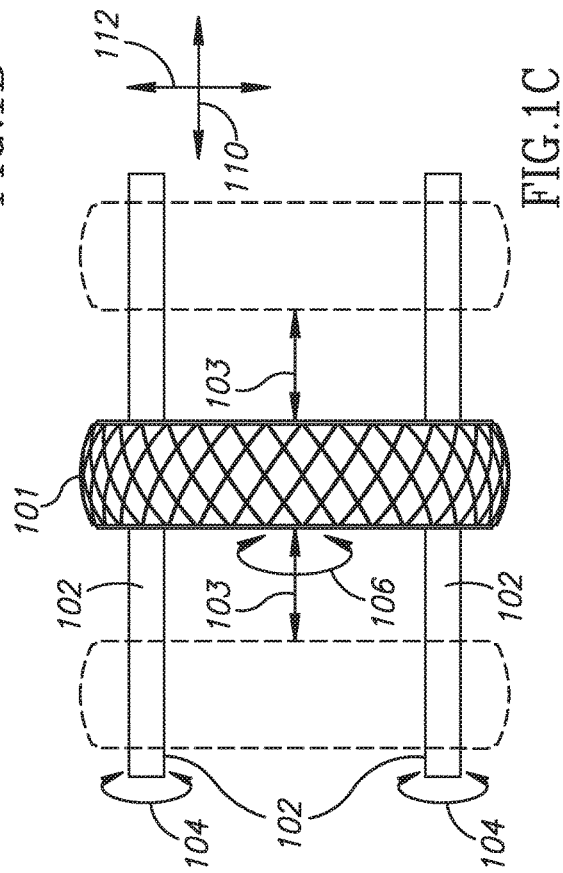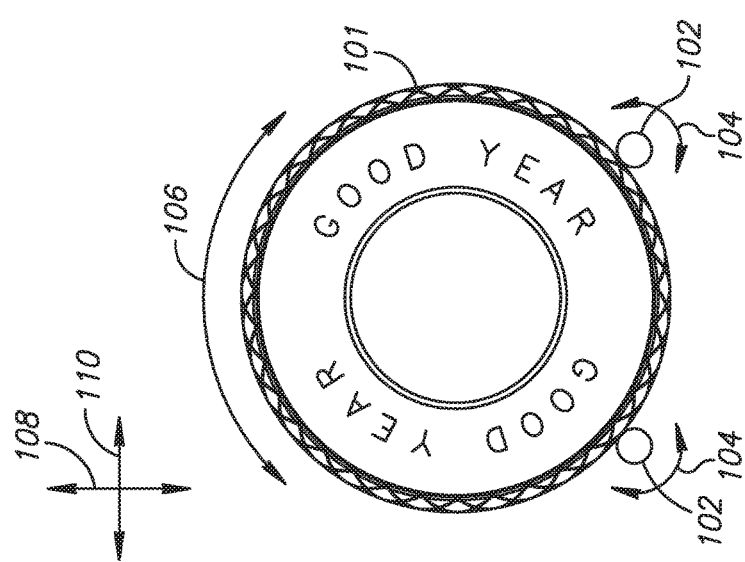

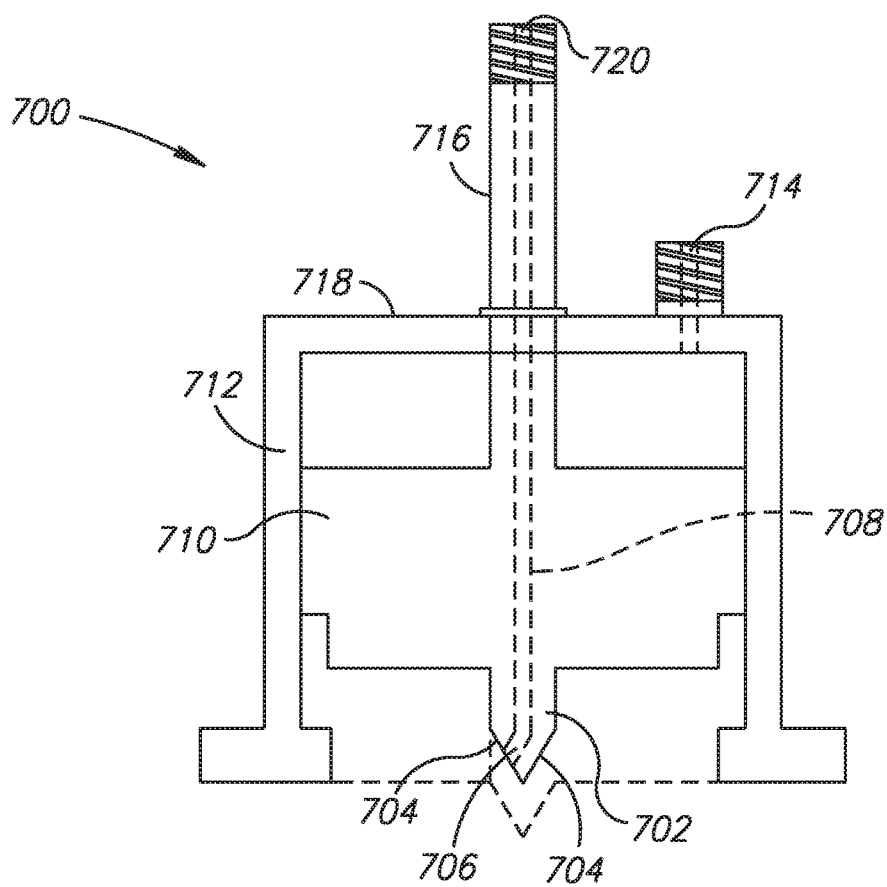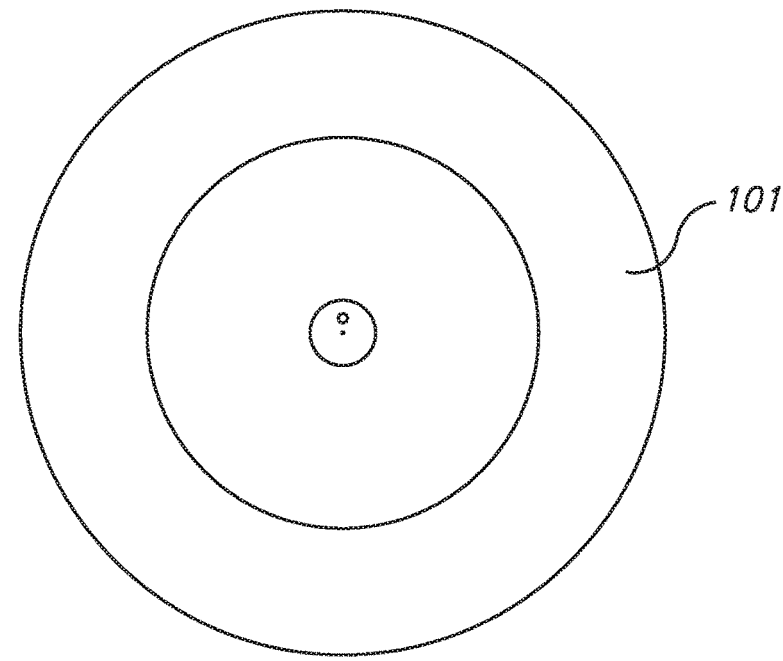
FIG.7A

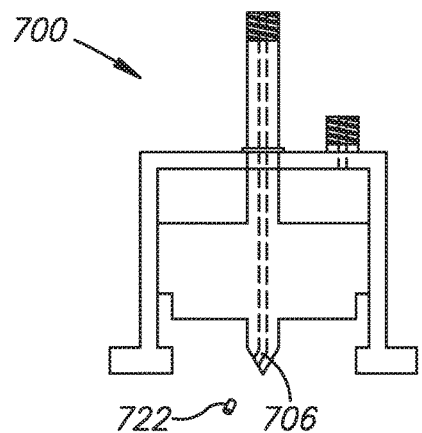 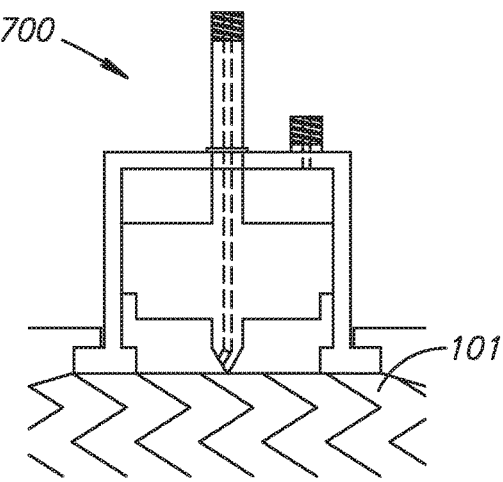
FIG.7B  FIG.7C
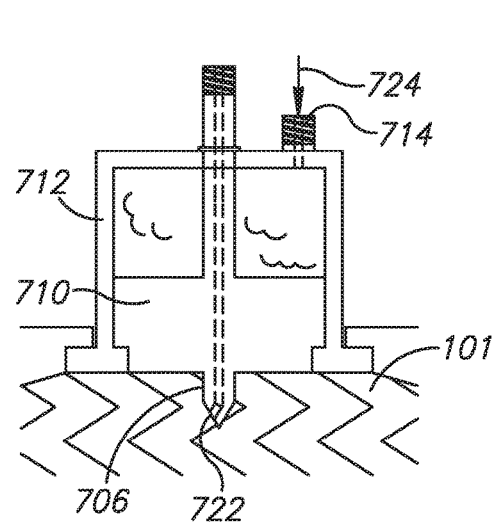 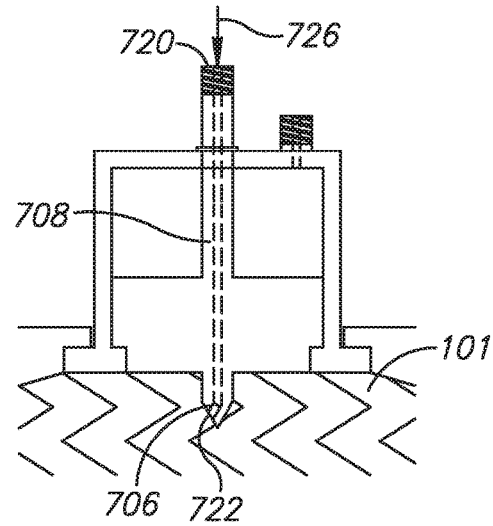
FIG.7D  FIG.7E
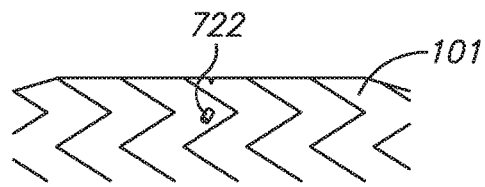
FIG.7F

SYSTEM FOR TIRE STORAGE, RETRIEVAL, AND INVENTORY MANAGEMENT

PRIORITY CLAIM

This application is a continuation of U.S. application Ser. No. 15/087,849, filed on Mar. 31, 2016, which application is incorporated herein by reference in its entirety.

FIELD OF THE INVENTION

This application relates to the storage of tires for vehicles.

BACKGROUND OF THE INVENTION

In retail tire stores, large auto dealerships, motor pools and other facilities that install large numbers of automotive tires, storage and handling of the tires has always been a challenge because of the size, shape and weight of the tires.

Tires are typically stored on floor-to-ceiling racks with narrow access aisles between them. In the smaller and older shops, tires are stocked and retrieved by hand with store personnel climbing ladders to place the tires on the racks and then to "pull" them off when they are sold. Having personnel balancing on ladders high above floor level while handling tires is an invitation to injury accidents and industrial insurance claims. In larger shops, fork lift trucks and pallets are used to handle the tires but placing them on and retrieving them from overhead racks is still a time-consuming and sometimes dangerous operation.

In addition, the fact that access aisles must be provided between the tire racks makes storage density a major problem. The number of tires per 100 square feet of floor space that can be stored on racks with aisles between them is far less than would be the case if the tires could be stored close to each other in all directions with only inches between them. This fact precludes location of tire stores in high cost real estate locations even though the locations might be close to many potential qualified customers (in major metropolitan business districts, for example).

An additional problem with the current system is managing tire inventory, both recorded and physical. Typically, when a shipment (truckload) of tires arrives at a store from a distributor/manufacturer, the tires are physically checked against the bill of lading or invoice, the model or part number, quantity, description, etc. are entered into a computer data base and the tires are then placed in storage racks with labels identifying individual tires either on the tires themselves or on the front of the rack where that size/make of tire is customarily stored. Since the mix of tire sizes, types and manufacturers in inventory changes constantly, the exact location of any particular tire in storage at any particular time is always a question, which leads to wasted time and mistakes when it comes to "pulling" the tire from inventory for installation.

Most CPA firms and banks and other lenders require that a physical tire inventory count be reconciled with the recorded inventory at least once a year. This requires more personnel on ladders checking the racks of tires, which takes more hours and exposure to accidents and mistakes.

The systems and methods disclosed herein provide an improved approach for the storage and retrieval of tires and for managing a tire inventory.

SUMMARY OF THE INVENTION

In one aspect of the invention a system for managing tire inventory defines a horizontal direction and a longitudinal direction perpendicular to the horizontal direction. The system includes a plurality of rods each defining an axis of rotation parallel to the horizontal direction, the axes of rotation of the plurality of rods being offset from one another along the longitudinal direction such that a plurality tires may be supported by pairs of adjacent rods of the plurality of rods. At least one motor is coupled to the plurality of rods effective to selectively rotate each plurality of rods about the axes of rotation thereof. At least one actuator is positioned adjacent the rods of the plurality of rods and defines at least one engagement member positioned to cause a tire of the plurality of tires at least one of (a) move parallel to the axes of rotation of a pair of adjacent rods of the plurality of rods in response to activation of the actuator, and (b) move from resting on a first and a second rod of the plurality of rods to resting on a second and a fourth rod of the plurality of rods.

In some embodiments, each rod of the plurality of rods further includes a plurality of indentations distributed along the length thereof. For example, the plurality of indentations may include (a) a first conical section tapering from a first wide end to a first narrow end that has a smaller cross section than the first wide end, and (b) a second conical section tapering from a second-wide end to a second narrow end that has a smaller cross section than the second-wide end, the first narrow end abutting the second narrow end.

In some embodiments, the at least one engagement member comprises at least one plate positioned between the pair adjacent rods of the plurality of rods. The at least one actuator includes at least one first actuator positioned to move the plate upward between the adjacent rods an amount effective to permit the tire of the plurality of tires to roll over one of the rods of the pair of adjacent rods. In some embodiments, the plurality of rods include a plurality of rod pairs, each rod of the plurality of rods being included in one and only one rod pair of the plurality of rod pairs. The at least one plate comprises a plurality of plates such that multiple plates of the plurality of plates are positioned between the rods of each rod pair. In such embodiments, the at least one first actuator includes a plurality of first actuators each engaging one plate of the plurality of plates.

In some embodiments, the at least one actuator includes at least one second actuator positioned above the plurality of plates. In such embodiments, the at least one engagement member may include at least one nudging member, the second actuator configured to move the at least one nudging member parallel to the axes of rotation of the plurality of rods.

In some embodiments, the at least one nudging member includes first and second arms offset from one another in the horizontal direction, the first and second arms each having a roller mounted thereto, the roller being rotatable about an axis of rotation parallel to the vertical direction.

In some embodiments, the system includes at least one third actuator, the at least one third actuator configured to selectively move the nudging member upward away from the plurality of plates. The at least one nudging member may include a plurality of nudging members, each nudging member of the plurality of nudging members being positioned along between adjacent rods of the plurality of rods along the horizontal direction.

In some embodiments, the plurality of rods includes a plurality of sets of rods offset from one another along a vertical direction perpendicular to the horizontal direction and longitudinal direction. The system may further include an elevator configured to move between the sets of rods. In some embodiments, the elevator further includes a pair of elevator rods and at least one elevator motor configured to rotate the pair of elevator rods.

In another aspect of the invention, a method for managing tire inventory includes providing a three-dimensional storage array defining a plurality of storage locations $P(i,j,k)$, where i is a horizontal position from i=1 to L, where j is a longitudinal position from j=1 to M, and k is a vertical position from k=1 to N. The method further includes providing at each storage location $P(i,j,k)$ a lifting actuator $A(i,j,k)$; providing at each vertical position k and longitudinal position, a rod pair $R(j,k)$ each rod pair $R(j,k)$ extending across all horizontal positions i=1 to L; and providing at least one motor coupled to the rod pairs $R(j,k)$ and configured to rotate rods of each rod pairs $R(j,k)$. The method further includes providing a controller coupled to the lifting actuators $A(i,j,k)$.

The controller receives an instruction to retrieve a tire $T(a,b,c)$ located at position $P(a,b,c)$, where a is an integer less than or equal to L, b is an integer less than or equal to M, and c is an integer less than or equal to N. In response to the instruction, the controller invokes spinning of at least a portion of the rods $R(j,k=c)$ and actuates a portion of the lifting actuators $A(i, j, k=c)$ effective to engage the tire $T(a,b,c)$ such that the spinning of the tire $T(a,b,c)$ causes the tire $T(a,b,c)$ to roll toward a forward edge of the three-dimensional storage array in response to engagement with each lifting actuator of the portion of the lifting actuators $A(i, j, k=c)$.

In some embodiments, the method further includes providing horizontal actuators $H(i,j,k)$ at the storage locations $P(i,j,k)$ and offset above the lifting actuators $A(i,j,k)$, each actuator $H(i,j,k)$ configured to shift a tire at a given storage location $P(i=i_1,j=j_1,k=k1)$ to at least one of storage locations $P(i_1-1,j_1,k_1)$ and $P(i_1+1,j_1,k_1)$. In such embodiments, the method further includes activating, by the controller, at least a portion of the horizontal actuators $H(i,j,k=c)$, effective to move at least one tire positioned between storage location $P(a,b,c)$ and the forward edge of the three-dimensional storage array out of horizontal position i=a to horizontal position i=a1, where a1 is equal to one of a+1 and a−1, thereby permitting rolling of the tire $T(a,b,c)$ toward the edge of the three-dimensional storage array. Another embodiment includes activating, by the controller, a horizontal actuator $H(i=a,j=b,k=c)$, effective to move the tire $T(a,b,c)$ out of horizontal position i=to horizontal position i=a1, where a1 is equal to one of a+1 and a−1, in response to determining that another tire is located between the storage location $P(a,b,c)$ and the forward edge of the storage array.

In some embodiments, the horizontal actuators $H(i,j,k)$ each include first and second arms protruding downwardly toward lifting actuators $A(i,j,k)$, the first and second arms sized to be positioned on either side of a tire stored at one of the locations $P(i,j,k)$. Pivoting actuators $V(i,j,k)$ may be coupled to the first and second arms of the horizontal actuators $H(i,j,k)$ and operated by the controller. The method may further include invoking, by the controller, pivoting upward of a pivoting actuator $V(i=a1, j=b, k=c)$ prior to activating, by the controller, the horizontal actuator $H(i=a, j=b,k=c)$.

In some embodiments, the controller is programmed to store a map that maps each of the positions $P(i,j,k)$ to a corresponding tire description. In such embodiments, the method may further include, in response to each movement of each tire by any of the lifting actuators $A(i,j,k)$ and horizontal actuators $H(i,j,k)$, mapping a descriptor of the each tire to a new position $P(i,j,k)$ to which the each tire was moved by the each movement.

In some embodiments, the three dimensional storage array further comprises one or more sensors $S(i,k)$ located at each of the horizontal positions i and vertical positions k, the sensors being located between a longitudinal position j=1 and the forward edge of the three dimensional storage array, where j=1 is the longitudinal position closest to the forward edge, the controller being coupled to the one or more sensors. In such embodiments, the method may further include detecting, by the controller, an output of one of the sensors $S(i=i_2, k=k_2)$, where $i_2$ is an integer less than L and $k_2$ is an integer less than N. The controller decodes the output to determine a tire descriptor. The controller then stores the tire descriptor in the map as corresponding to position $P(i=i_2, j=1, k=k_2)$. The sensor may be embodied as an electronic chip reader.

In some embodiments, the controller is further programmed to evaluate a seasonal access frequency for each tire descriptor and activate at least a portion of the lifting actuators $A(i,j,k)$ and horizontal actuators $H(i,j,k)$ effective to move tires corresponding to tire descriptors that are accessed more frequently in a current season closer to the forward edge of the three-dimensional storage array than tires corresponding to tire descriptors that are accessed less frequently in the current season.

In some embodiments an elevator is coupled to the controller and the method further includes invoking, by the controller, movement of the elevator to a vertical position k=c in response to the instruction to retrieve the tire $T(a,b,c)$.

BRIEF DESCRIPTION OF THE DRAWINGS

Preferred and alternative examples of the present invention are described in detail below with reference to the following drawings:

FIG. 1A is a side view of a tire spinning on rollers for use in a storage array in accordance with an embodiment of the present invention;

FIGS. 1B and 1C illustrate horizontal movement of a spinning tire along rollers in accordance with an embodiment of the present invention;

FIGS. 7A through 7F illustrate the use of an apparatus for installing electronic chips in tires in accordance with an embodiment of the present invention;

FIGS. 9A to 9F are schematic block diagrams illustrating the loading and unloading of tires using a storage array in accordance with an embodiment of the present invention.

DETAILED DESCRIPTION OF THE PREFERRED EMBODIMENT

Figure 2B:
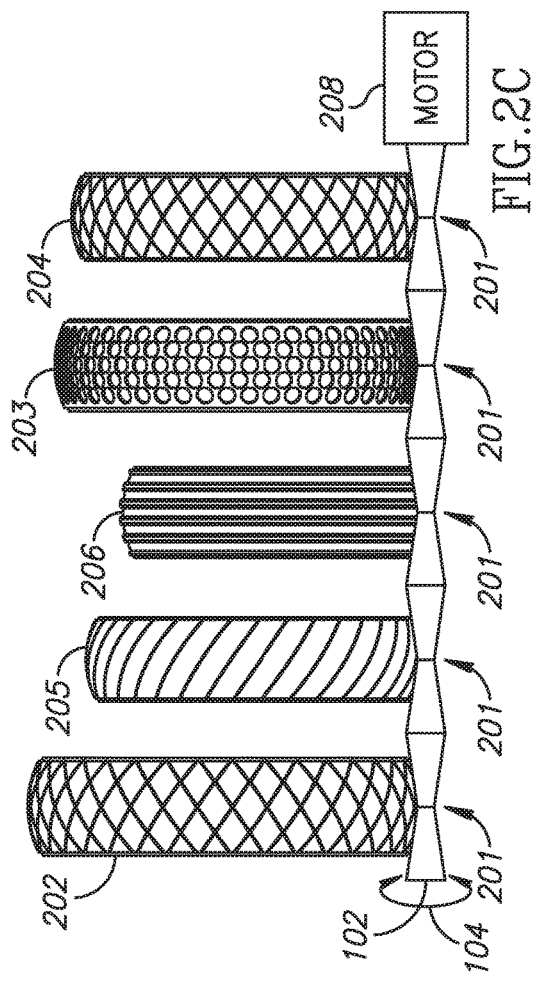
FIGS. 2B and 2C illustrate rollers having tapered portions for individual tires in accordance with an embodiment of the present invention.

The systems and methods disclosed herein solve all of the problems listed in the Background section. They enable tires to be placed in inventory almost as fast as they can be unloaded from the delivery truck with no personnel on ladders. An automated storage array is disclosed that stores tires in a small fraction of the space occupied by conventional racks since tires are stored in the storage array in close proximity to each other in three dimensions. The automated storage array retrieves and delivers tires from inventory on demand in a matter of seconds. A controller coupled to the storage array updates tire inventory data in a store computer database every time the storage array is used and can therefore produce a physical inventory count on demand at any time.

In addition, the automated storage array permits the use of sophisticated computer programs that can analyze individual tire inventory "turns" and determine where individual tires should be stored in the storage array for efficient retrieval.

FIGS. 1A, 1B, and 1C illustrate a schematic representation of principles of operation of the storage array. A more detailed implementation of the storage array is described below.

A vertically positioned tire 101 is supported on two small diameter spinning rollers 102 (e.g., having a diameter much smaller than the diameter of the tire, such as less than 10%, or less than 15%, of the diameter of the tire 101), whose axes of rotation (and symmetry) are parallel to the axis of rotation the tire 101. As the rollers 102 spin and cause the tire 101 to spin, the tire 101 may be moved from side to side (e.g., in a horizontal direction) with very little force 103 and will stay substantially vertical during side-to-side movement because of the rotational inertia of the tire 101, provided an applied horizontal force or "nudge" 103 is not too large.

As is apparent in FIGS. 1A to 1C the rollers 102 define a rotational direction 104 and the tire 101 defines a rotational direction 106 that will be opposite the rotational direction 106. The operation may be further understood with respect to a vertical direction 108 corresponding to the direction of gravity, a longitudinal direction 110 perpendicular to the vertical direction 108 and to the axes of rotation of the tire 101 and rollers 102, and a lateral direction 112 that is parallel to the axes of rotation of the tire 101 and rollers 102. As is apparent in FIGS. 1A and 1C, the rollers 102 are offset from one another in the longitudinal direction by a distance that is less than the diameter of the tire.

Figure 2C:
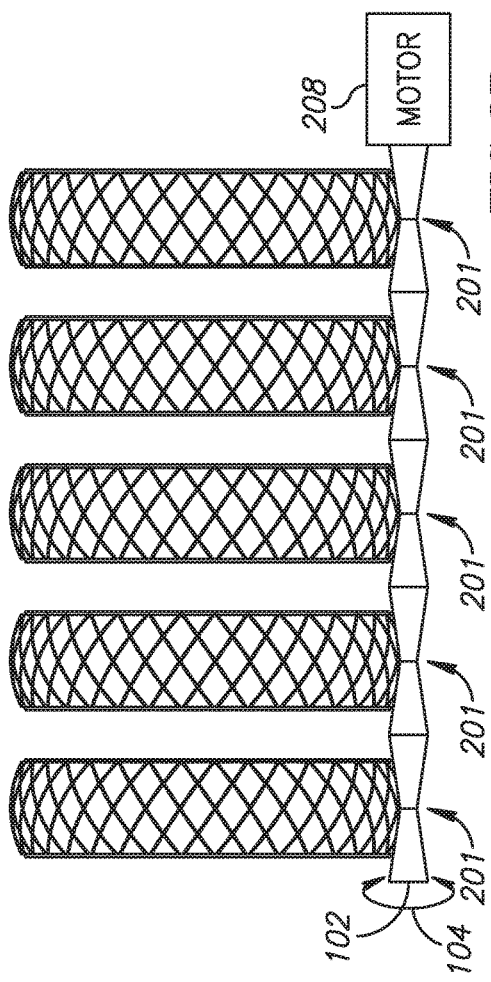
Figure 2A:
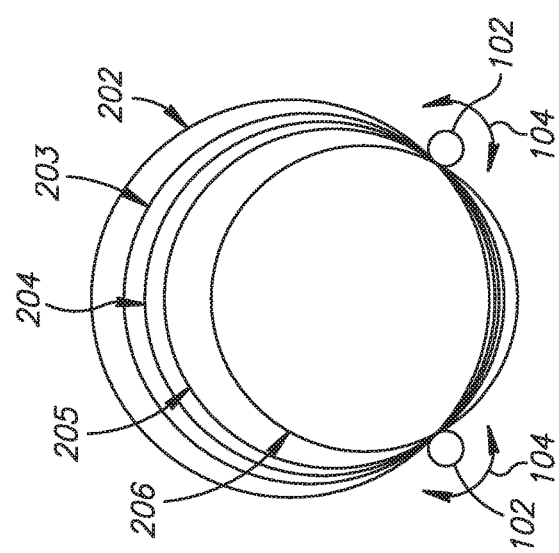
FIG. 2A is a side view illustrating various sizes of tires resting on rollers of a storage array in accordance with an embodiment of the present invention.

Referring to FIG. 2A, various tires 202-206 may be used with the same rollers 102 with the same longitudinal separation. Accordingly, separation of the rollers 102 in the longitudinal direction 110 may be selected such that it is substantially smaller than the diameter of the smallest wheel to be stored, e.g., between 80 and 50 percent of the diameter of the smallest wheel to be stored on the rollers 102.

Referring to FIGS. 2B and 2C, Further, in some embodiments, the rollers 102 may be provided with indentations 201 formed therein. In the illustrated embodiment, the indentations 201 are wide, very shallow "Vs" 201 machined into the rollers 102. For example, the width of a "V" 201 may be between 20 and 40 times its depth. Each "V" 201 may be embodied as two conical sections, the one on the left tapering to a smaller diameter up to a middle point and the one on the right flaring to a larger diameter from the middle point, such that the narrow ends of the conical sections are joined together at the middle point. Each "V" 201 on a roller 102 has an opposite (e.g., located at the same location along the horizontal direction 112) and similarly shaped and sized "V" 201 in the adjacent roller 102.

In use, any spinning tire 101 that is nudged into a "V" pair 201 will settle into and stay in that "V" pair 201 unless/until it is nudged sideways into an adjacent "V" pair 201. The angle of the "Vs" 201 may be so shallow that the spinning tire will climb up the sides of the shallow "Vs" 201 and move over to the next "V" 201 pair and settle into it as it is being nudged while staying substantially vertical and at a right angle to the spinning rollers.

The shallow "Vs" 201 of the rollers 102 can accommodate any tire shape and size 202-206 provided the tire tread width is no wider than the width of the "V" 201 and the tire diameter is large enough so that the tire will be supported by the spinning rollers 102 rather than squeezed by the rollers 102. Tires with wider, flatter treads will ride higher in the "Vs" 201 while tires with narrower, rounded tread designs will ride lower in the "Vs" 201. The "Vs" 201 may be uniform in dimensions for all rollers 102 in the storage array such that the same range of tires may be stored over each pair of rollers 102.

A motor 208 may coupled to each roller 102. Alternatively, a single motor may be coupled to multiple rollers 102. The motor 208 preferably is a bi-directional motor such that the rollers may be caused to rotate in either direction. The motor 208 may be an electric motor, hydraulic motor, pneumatic motor, or any other type of device capable of inducing rotational movement.

Figure 3A:
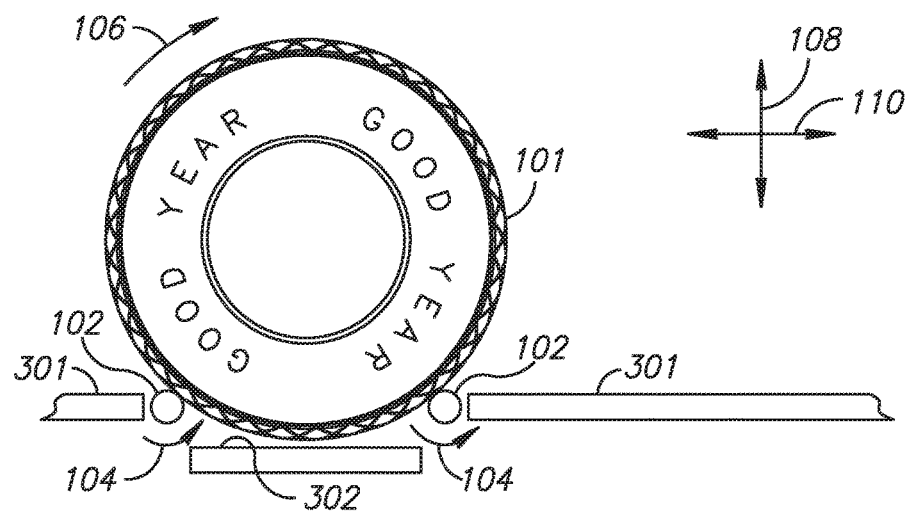
FIGS. 3A and 3B illustrate a friction plate for causing spinning tires to advance along a longitudinal direction in accordance with an embodiment of the present invention.
Figure 3B:
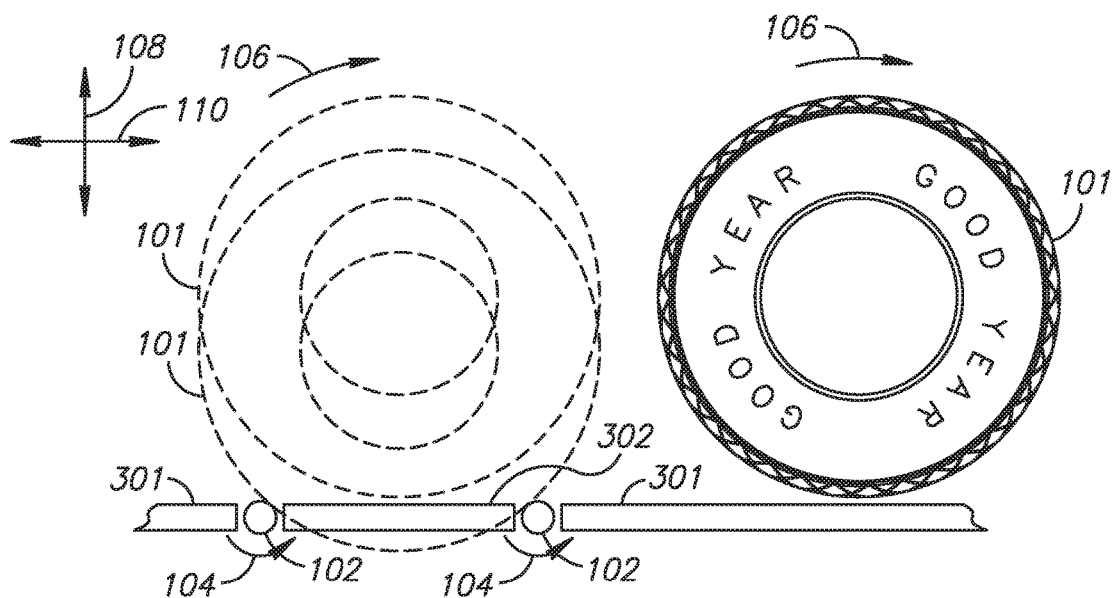

Referring to FIGS. 3A and 3B, in some embodiments, fixed horizontal surfaces 301 are positioned outboard of the rollers 102 and tire 101 along the longitudinal direction 110 and in line with the centerline of the tire tread. The horizontal surfaces 301 may be aligned in the vertical direction 108 with the top of the spinning rollers 102, e.g., the largest diameter portion of the spinning rollers 102 including indentations 201.

A vertically movable surface 302 is raised from a first position (FIG. 3A) under the center of the portion of the spinning tire 101 that hangs down between the two rollers 102. The movable surface 302 preferably does not contact the spinning tire 101 in the first position. The movable surface 302 is raised to a second position (FIG. 3B) such that the upper surface thereof is at least flush, e.g., at the same height, with the fixed horizontal surfaces 301. In the second position, the upper surface of the movable surface 302 may be parallel to the longitudinal direction 108, horizontal direction 112 and to the fixed horizontal surfaces 301.

Friction between the tire tread and the movable surface 302 will cause the tire 101 to roll and to continue in a relatively straight line on the fixed horizontal surface 301. The rotational inertia of the tire 101 causes it to stay vertical, provided the tire 101 is initially spinning fast enough such that that not all of its rotational energy is dissipated by friction with surface 302 or in being converted to translational kinetic energy.

In the illustrated embodiment, the rollers 102 rotated counterclockwise, causing the tire 101 to rotate clockwise. Accordingly, upon raising of the movable surface 302 to the second position, the tire 101 rolls to the right. Movement to the left may be achieved by spinning the rollers 102 clockwise prior to raising the movable surface 302.

Figure 4A:
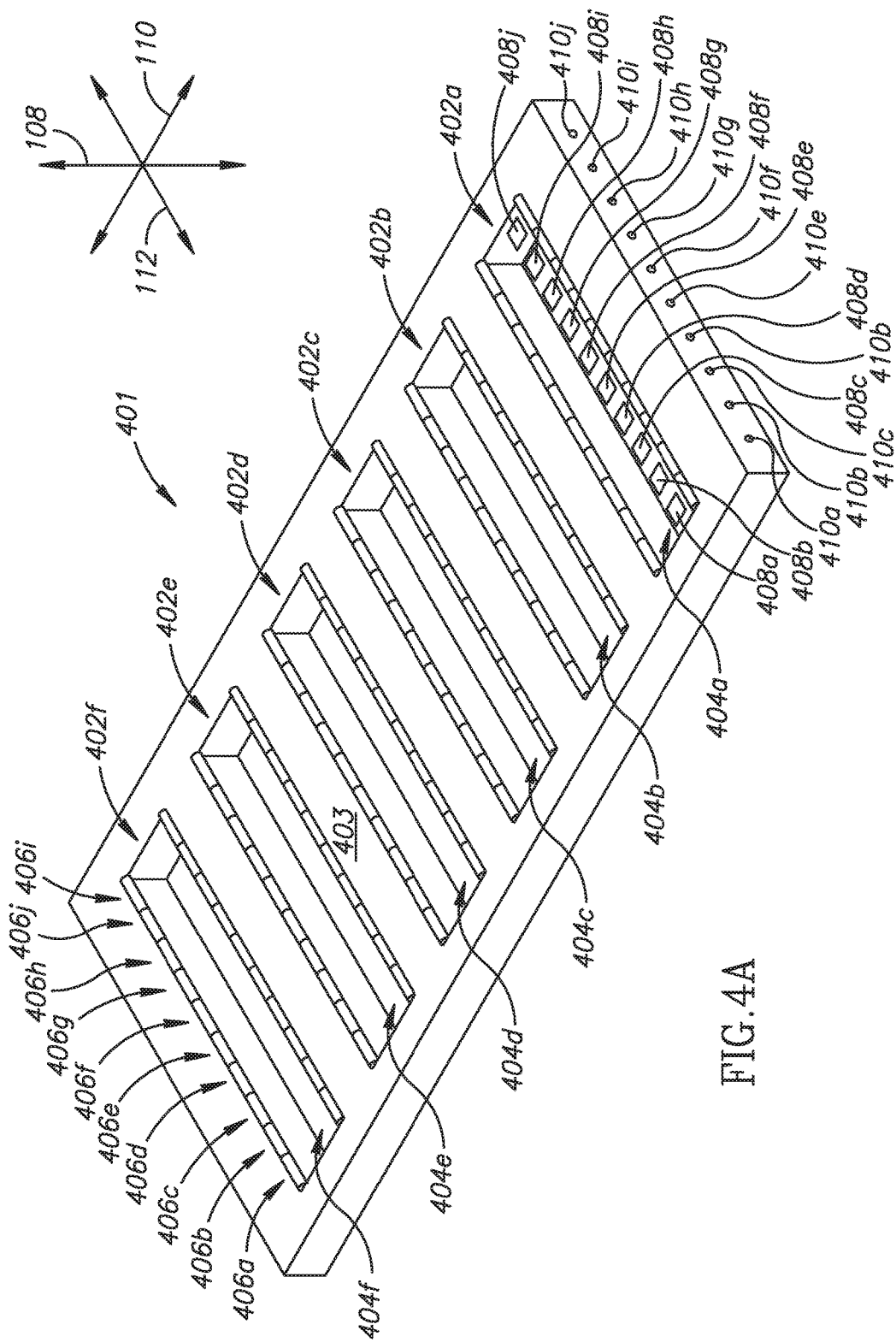
FIG. 4A illustrates a tier of a storage array having a plurality of pairs of spinning rods in accordance with an embodiment of the present invention.
Figure 4B:
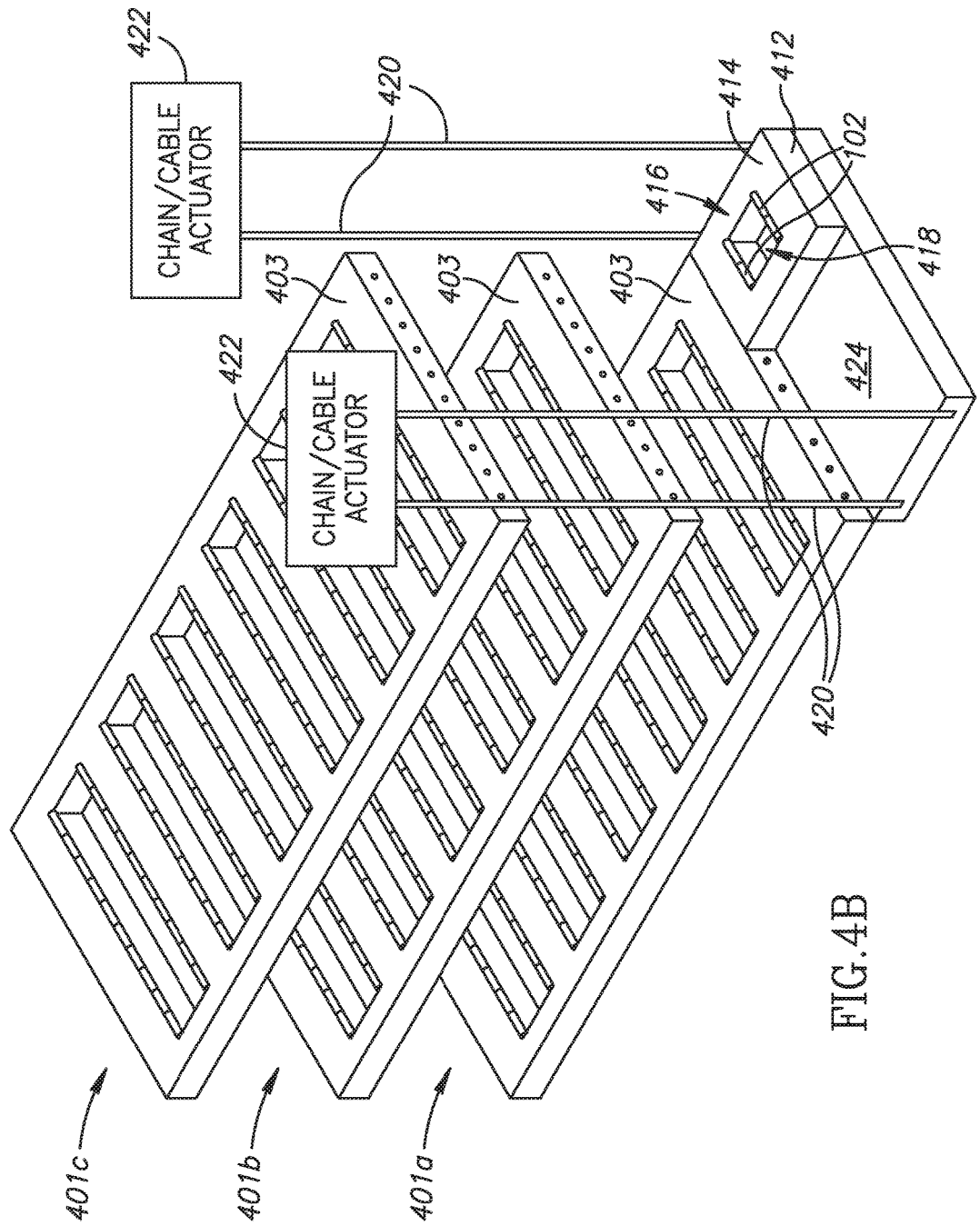
FIG. 4B illustrates a storage array with multiple tiers and an elevator in accordance with an embodiment of the present invention.

Referring to FIGS. 4A and 4B a storage tier 401 is the basic structural framework and platform that supports the other parts of the storage array and to which the other parts are attached. A typical embodiment of the storage will have two, three, or four or more storage tiers 401a-401c stacked one above the other and each performing the same functions. A storage tier 401 may include a plurality of roller pairs 402a-402f each including a pair of rollers 102. Each roller pair 402a-402f defines a longitudinal storage location. Herein below "roller pair 402a-402f" shall be used interchangeably with "longitudinal storage location 402a-402f." As illustrated, an opening 404a-404f is defined in an upper surface 403 of the tier 401 between the rollers 102 of each roller pair 402a-402f for receiving the vertically movable surfaces 302. As is also apparent, the upper surface 403 of the tier 401 extends between pairs 402a-402f of rollers 102 and beyond the first and last pairs of rollers 402a, 402f. In this manner the upper surface 403 provides a surface on which tires may roll when caused to do so by lifting of the vertically movable surfaces 302.

Each roller 102 of each roller pair 402a-402f defines a plurality of storage locations 406a-406j. Each storage location may include an indentation 201 as described above. Each storage location 406a-406j may include a corresponding movable surface 302 positioned at the storage location 406a-406j between the rollers 102 of each roller pair 402a-402f such that a tire at a particular location 406a-406j may be lifted and caused to roll independent of other tires resting on the same roller pair 402a-402f.

Accordingly, as is apparent from FIGS. 4A and 4B, the arrangement of the storage tiers 401a-401c, roller pairs 402a-402f, and storage locations 406a-406j provides a three dimensional array or grid of storage locations. The vertical location of each tier 401a-401c may be defined as a vertical coordinate k, k=1 to 3, in the illustrated embodiment. The longitudinal position of each roller pair 402a-402f corresponds to a longitudinal coordinate j, j=1 to 6 in the illustrated embodiment. The horizontal location of each storage location 406a-406j corresponds to a horizontal coordinate i, i=1 to 10 in the illustrated embodiment. Accordingly, a three dimensional array of storage locations P(i,j,k) is defined at each combination of coordinates j, and k.

The rollers 102 of each roller pair 402a-402f may have a width in the horizontal direction 112 that is almost as large as the width of the roller deck (e.g., within 80, preferably 90, percent). The axes of rotation of the roller pairs 402a-402f may be below and parallel to the upper surface 403 and are spaced apart uniformly in the longitudinal direction 110. The rollers 102 of the roller pairs 402a-402f may be positioned along the vertical direction 108 such that the top of the widest diameter of the rollers in the roller pairs are at the same height as the upper surface 403. However, in some embodiments, the highest points of the rollers 102 of the roller pairs 402a-402f may be slightly higher or slightly lower than the upper surface 403 and still function adequately.

The distance between the individual rollers 102 of each roller pair 402a-402f in the storage tier 401 is dependent on the minimum and maximum diameters of the tires in the mix of tires to be stored. Tires of many different diameters can be stored at the same time and any size tire can be stored in any storage position. The distance between individual rollers 102 in each roller pair 402a-402f is preferably long enough such that the largest diameter tire will be well supported without a tendency to topple when it is not spinning and short enough such that the smallest diameter tire will not fall through or be squeezed by the rollers. The distance between roller pairs 402a-402f on the storage tier 401 is preferably great enough such that the largest diameter tires stored in longitudinally adjacent pairs of rollers pairs 402a-402f will not touch. Spacing between individual rollers 102 in each roller pair 402a-402f and between the roller pairs 402a-402f themselves is preferably uniform throughout the storage array, e.g., for all tiers 401a-401c, such that any tire can move to any tire position within the storage array. However, in other embodiments, non-uniform roller 102 spacing and roller pair 402a-402f spacing may be used such that certain roller pairs 402a-402f are only suitable for larger or smaller tires.

When power is applied to the roller pairs 402a-402f, both rollers spin in the same direction. The tires resting on the roller pairs 402a-402f will also spin (in the opposite rotation from the rollers) and generate momentum and rotational inertial, causing them to orient themselves vertically and resist toppling. In some embodiments, a single motor drives all roller pairs 402a-402f of a given tier 401a-401c. In other embodiments, an individual motor or pair of motors drives each roller pair 402a-402f.

A tier 401 may further include one or more electronic components to facilitate inventory management. At each horizontal storage location 406a-406j, a sensor 408a-408j may be mounted on, at, or just below the upper surface 403 adjacent to a roller 102 of the first roller pair 402a such that the sensor 408a-408j will be close to, but not touch, a spinning tire resting on the first roller pair 402a. Specifically, the sensor 408a-408j will be located close enough to sense an electronic chip in the spinning tire but not be impacted by the largest or smallest possible tire that may be stored in the storage array. The sensor 408a-408j may be an RFID (radio frequency identifier) reader, electronic chip reader, or other sensing device. The sensors 408a-408j may also be any other type of sensing device, such as a camera for reading visual symbols, a bar code scanner, any other optical code scanner (e.g. QR (quick response) code scanner), and the like. Accordingly, tires may have RFID tags, optical codes, or other sensible structures secured thereto in accordance with the type of sensor 408a-408j that is used. In this manner, as each tire rolls onto the tier 401, the sensor 408a-408j may detect the tire and extract an identifier of the tire, thereby enabling automated identification of the tire for inventory management purposes as discussed in greater detail below. The tier 401 may further include indictor lights 410a-401j on a front surface of each storage location 406a-406j. The function of the indicator lights 410a-410j is described in greater detail below.

Referring specifically to FIG. 4B, in order to transport tires along the vertical direction 108 to and from the various tiers 401a-401c, an elevator deck 412 may be provided. The elevator deck 412 includes an elevator surface 414 and a roller pair 416 including two rollers 102. An opening 418 is defined between the rollers 102 and includes vertical lifting surfaces at each horizontal storage location 406a-406j in the same manner as the tiers 401a-401c. The configuration of the roller pairs 416 and the rollers 102 relative to the surface 414 may be identical to that of the roller pairs 402a-402f relative to the upper surface 403. As is apparent in FIG. 4B, the elevator surface 414 extends around the roller pair 416 and may be positioned flush or near flush (e.g., within 0.5 to 1 cm) of the upper surface 403 to enable rolling of tires back and forth between a tier 401a-401c and the elevator surface 414. As is apparent, the elevator deck 412 may hold the same number of tires as may be stored on one roller pair 402a-42f, i.e. the number of horizontal storage locations 406a-406j.

The elevator deck 412 may be coupled to any mechanism known in the art to raise and lower the elevator deck 412 in a controlled fashion. In the illustrated embodiment, the elevator deck 412 is coupled to cables 420 or chains 420 coupled to one or more actuators 422 that are operable to wind and unwind the cables 420 or chains 420 effective to raise and lower the elevator deck 412. In other embodiments, a pneumatic or mechanical lifting system may be used.

The elevator deck 412 is positionable adjacent to the first longitudinal position 402a in each tier 401a-401c and travels vertically between tiers 401a-401c so that it can transport a tire (or tires) to any tier 401a-401c and receive a tire (or tires) from any tier 401a-401c. In some embodiments, the elevator deck 412 further includes a horizontal actuator 424 such that it may be moved, as directed by the controller 800, between horizontal locations 406a-406j. For example, in some embodiments, the roller pair 416 of the elevator deck 412 only defines two horizontal storage locations (e.g., Vs 201). In some embodiments, the actuators 422 are mounted to a horizontal actuator 424. In the illustrated embodiment, the horizontal actuator 424 is raised and lowered by the actuators 422. The horizontal actuator 424 may be embodied as any electrical, mechanical, hydraulic, or pneumatic actuator known in the art for performing translational movement.

Figure 4C:
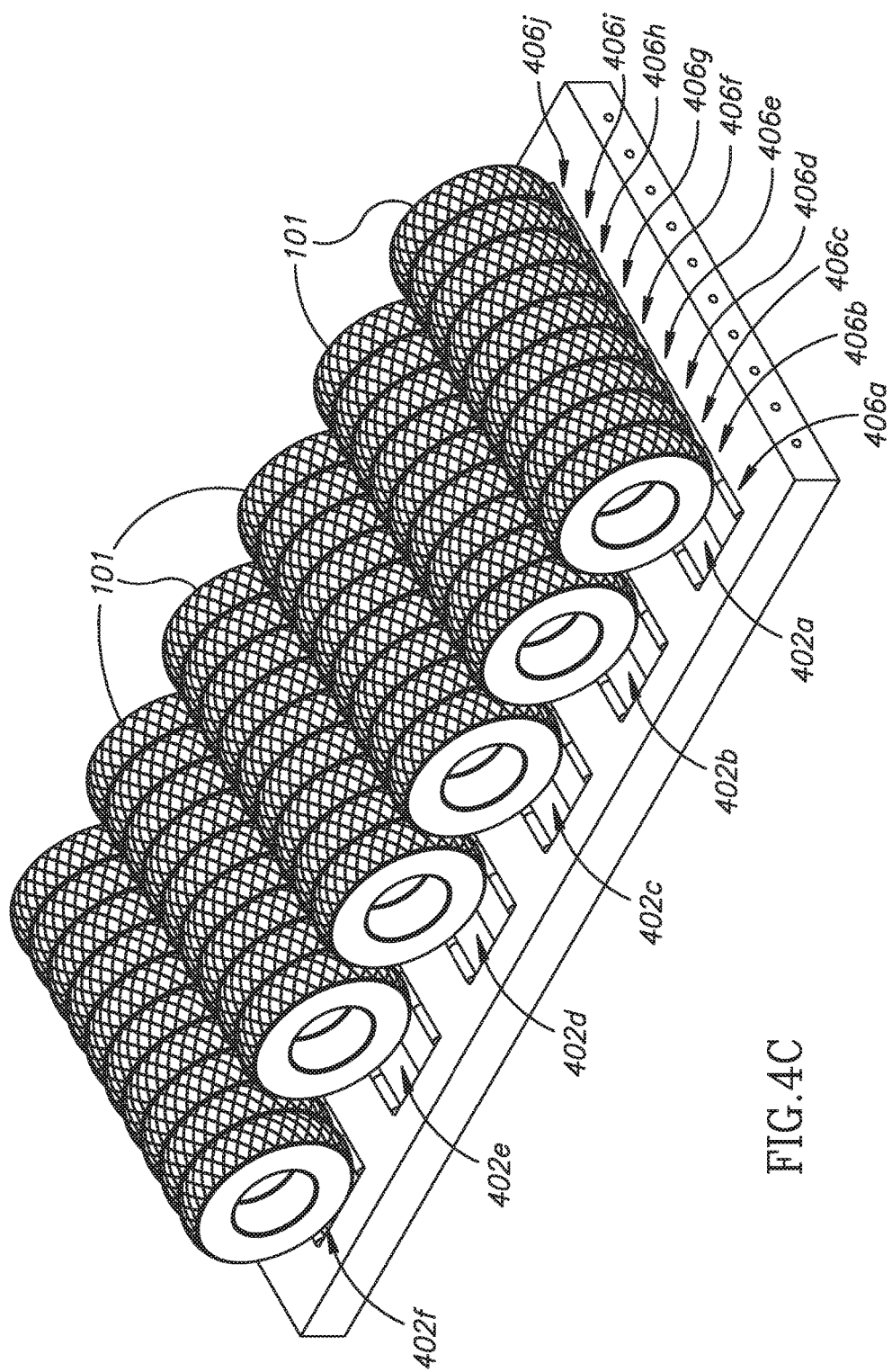
FIG. 4C illustrates a tier of a storage array stocked with tires in accordance with an embodiment of the present invention.

Referring to FIG. 4C, in use tires 101 are stored at some or all of the storage locations P(i,j,k). In some embodiments, all but the last roller pair 402f has at least one empty horizontal storage location 406a-406j. In this manner, tires may be shifted in the horizontal direction 112 to permit a tire located further from the front to roll forward to the front edge of the tier 401 or a tire may be shifted in the horizontal direction 112 to avoid another tire positioned between it and the front edge of the tier 401.

Figure 5A:
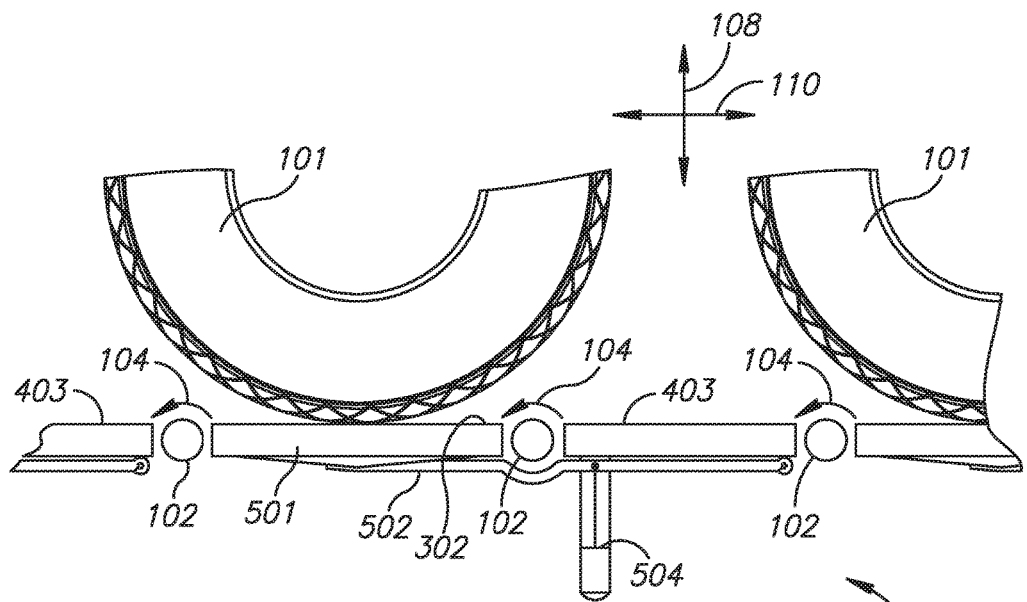
FIGS. 5A through 5C illustrate an implementation of an actuator for a lifting plate in accordance with an embodiment of the present invention.
Figure 5B:
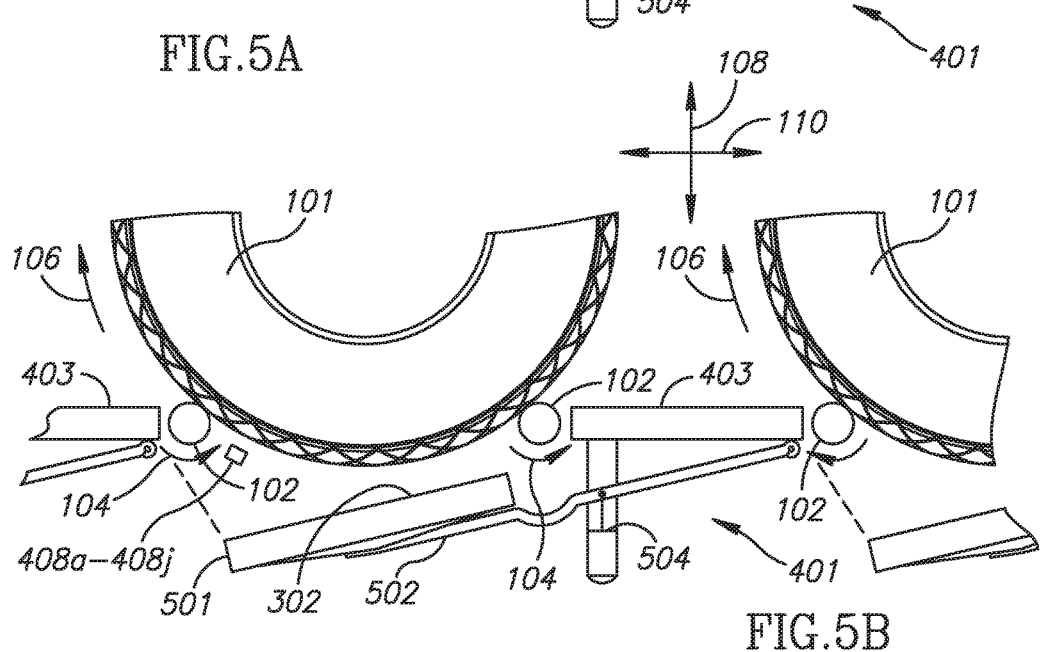

Referring to FIGS. 5A and 5B, the vertically movable surface 302 may be an upper surface of a plate 501. As is apparent in FIGS. 5A and 5B, the extent of the plate 501 in the longitudinal direction 110 is less than the longitudinal extent of the opening 404a-404f of between a pair of rollers 402a-402f such that the plate 501 may move up between the rollers 102 without interference. However, the longitudinal extent is sufficient to provide a surface for engaging a spinning tire 101. The horizontal extent (e.g., into the page of FIGS. 5A and 5B is slightly less (e.g., between 90 and 95 percent) of the width of the storage locations 406a-406j such that each plate 501 may be moved up and down without interference from an adjacent plate 501.

Various actuation means may be used to selectively raise and lower each plate 501 and its corresponding vertically movable surface 302 in order to achieve the functionality described with respect to FIGS. 3A and 3B. For example, in the illustrated embodiment, the plate 501 is mounted on a pivoting rod 502 or plate 502. A pneumatic or hydraulic actuator 504 is coupled to the tier 401 and to the rod 502. The actuator 504 may therefore be selectively activated to raise or lower the plate 501. Other actuators may also be used such as mechanical actuators, electrical actuators, and the like. In addition, rather than a pivoting motion, the actuator 504 may invoke a strictly vertical motion of the plate 501.

As shown in FIG. 5A, when the plate 501 is lowered, the tire 101 spins freely in direction 106 due to rotation 104 of the rollers 102. Upon raising of the plate 501, friction between the plate 501 and the tire 101 causes the tire to roll forward (right) in the longitudinal direction 110. The vertically movable surfaces 203 of the plate 501 may be textured or treated to enhance friction between itself and the tire 101. Of course, where the rollers 102 are caused to spin in an opposite direction (clockwise), the tire 101 would roll backward (left) in response to raising of the plate 501.

Referring specifically to FIG. 5B, the sensor 408a-408j for a particular horizontal location 406a-406j may be located between the rollers 102 of the first longitudinal position (i.e., closest to a front edge of the tier 401). The sensor 408a-408j is preferably mounted such that it is a close as possible to a tire located between the rollers 102 without being impacted by a spinning tire. For example, the sensor 408a-408j may be mounted at a position that will not be impacted by the smallest or largest tires that may be stored on the rollers 102. As is apparent in FIG. 5B, the sensor 408a-408j is located closer to one roller 102 than to the other of a roller pair. In this manner, the sensor 408a-408j is positioned to sense a wide range of tires since the middle of the span between the rods 102 will be the lowest point of a tire resting on the rollers 102 and will vary widely with the size of the tire. The sensor 408a-408j may be located closer to the forward roller 102 or the rearward roller 102 of a roller pair.

Figure 5C:
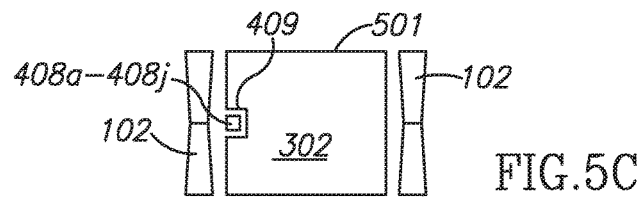

Referring to FIG. 5C, the plate 501 may include a notch 409 that is sized and positioned to provide clearance for the sensor 408a-408j corresponding to the horizontal storage location 406a-406j at which the plate 501 is located. In the illustrated embodiment, the notch 409 is located at the rearward edge of the plate 501. In other embodiments, the notch 409 is located at the forward edge. In still other embodiments, the sensor 408a-408j is mounted directly to the plate 501, such as in a recess defined by the plate 501.

Referring to FIGS. 6A to 6F, movement of tires 101 in the horizontal direction 112 may be facilitated by a nudger 600. The nudger 600 may include arms 601 that extend downwardly from a pivoting rod 602. The arms 601 include rollers 604 that rotate in response to contact with a spinning tire 101. The rollers 604 may simply be sleeves rotatably secured to the arms 601 or may include bearings to facilitate rotation. The rod 602 may be mounted to a horizontal actuator 606 that selectively slides the rod to the left or right in the horizontal direction 112. The horizontal actuator may be any pneumatic, hydraulic, electrical or mechanical actuator known in the art. The extent of horizontal movement of the horizontal actuator 606 may be the width of an individual storage locations 406a-406 to the right and to the left (or just to the right or just to the left for nudgers 600 located at the left or right edges, respectively).

The rod 602 may be mounted to a pivoting actuator 608. The pivoting actuator 608 pivots the rod 602 about an axis of rotation parallel to the longitudinal direction. The pivoting actuator 608 may be any pneumatic, hydraulic, electrical or mechanical actuator known in the art.

An instance of the illustrated nudger 600 may be mounted to each tier 401a-401c above each storage location P(i,j,k). For example, when lowered and at a central position in their horizontal range of motion, the arms 601 and rollers 604 may be longitudinally centered between pair of rollers of a roller pair 402a-402f (e.g., within 15% of the separation distance of the rollers 102 from the midway point between the rollers) and horizontally located within the horizontal extent of a storage location 406a-406j. The separation between the arms 601 and rollers 604, e.g., inner most facing portions of the rollers 604, may be equal to or less than the width of the storage locations 406a-406j. In particular, the separation and width of the rollers 604 may be such that they do not interfere with a tire 101 positioned between the rollers 604 of a nudger 600 and do not interfere with another tire 101 positioned adjacent the nudger 600. The rod 602, the actuators 606, 608, and any other structures of the nudgers 600 other than the arms 601 that might interfere with a spinning tire 101 are positioned higher above the upper surfaces 403 of the tier than the diameter of the largest tire to be stored in the machine.

Figure 6A:
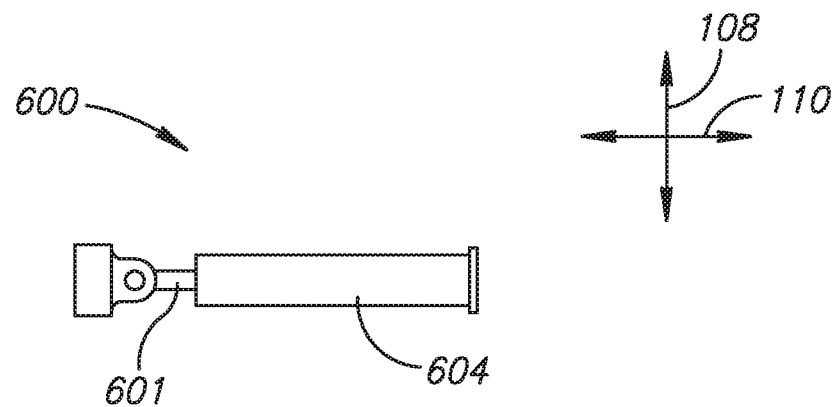
FIGS. 6A through 6F illustrate operation of a nudger in accordance with an embodiment of the present invention.
Figure 6B:
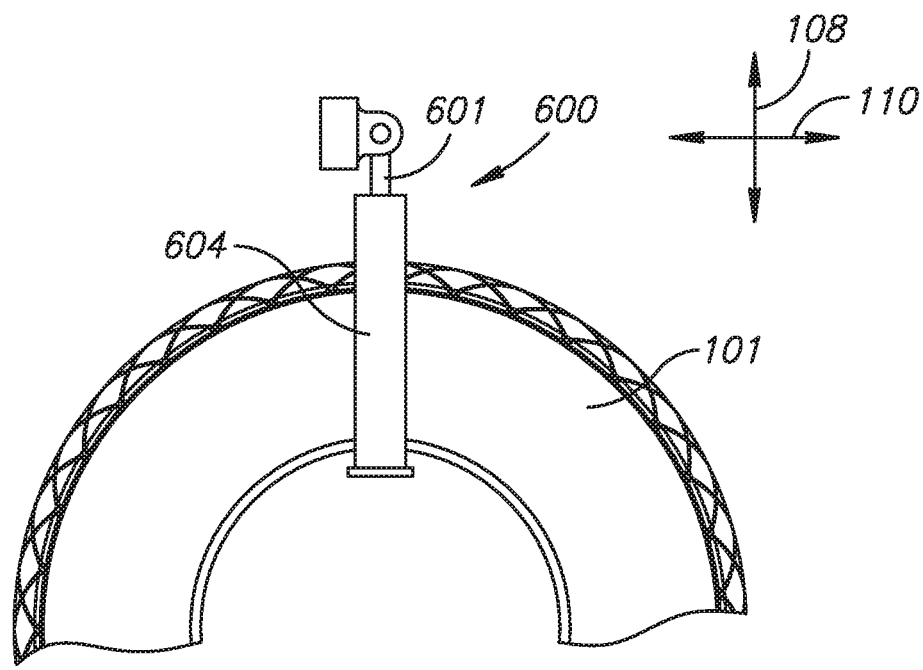
Figure 6C:
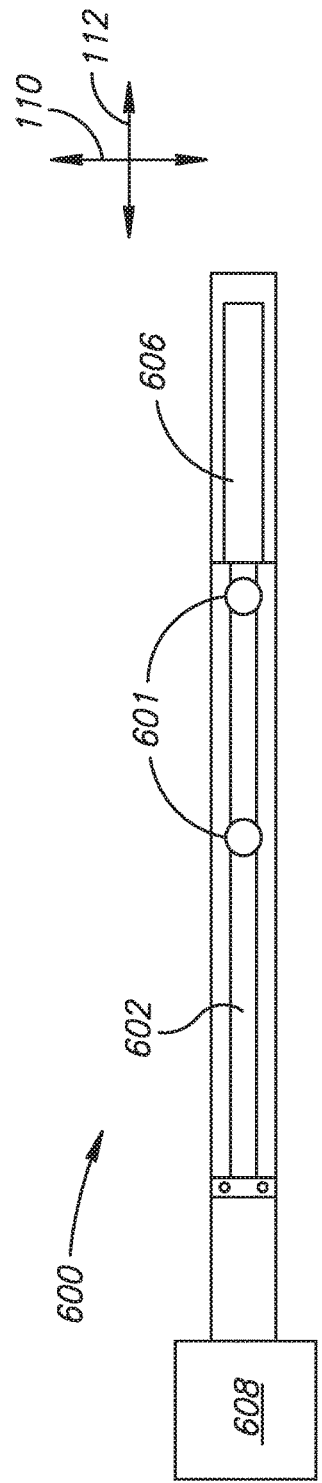
Figure 6D:
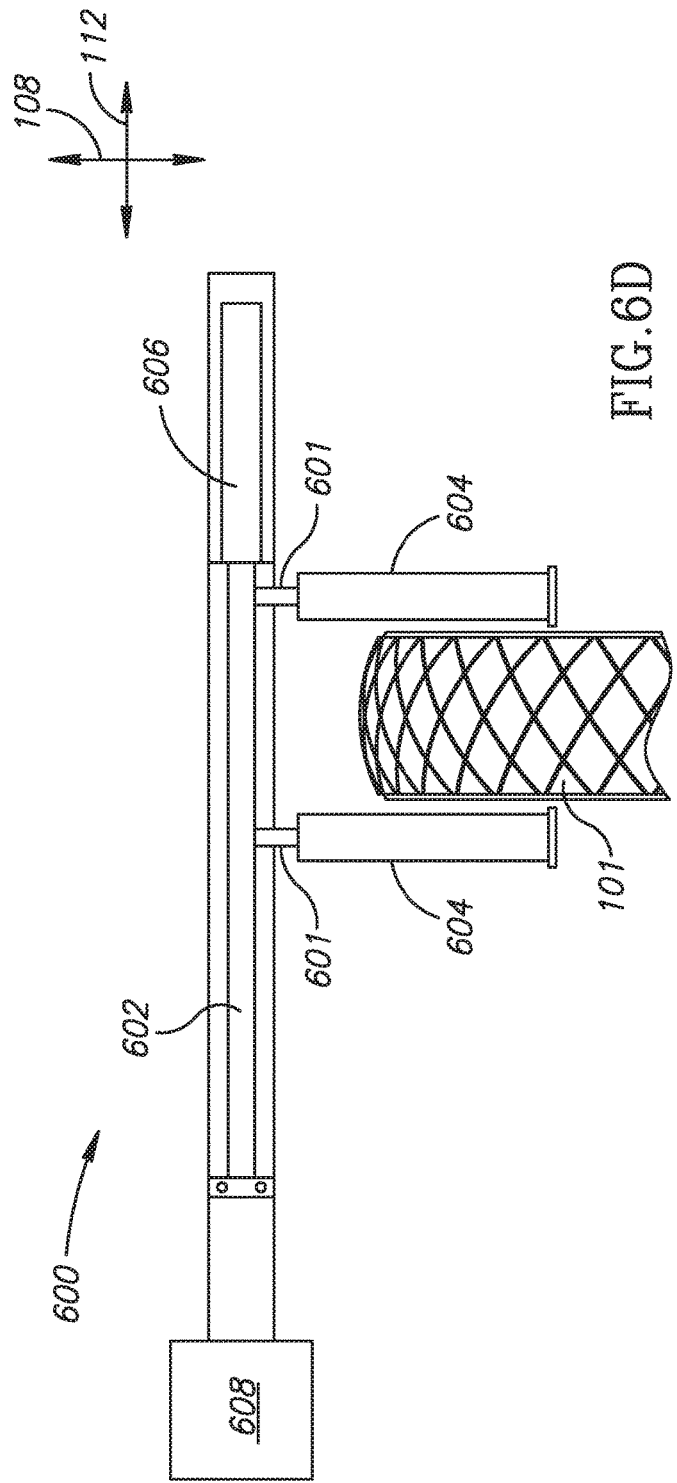
Figure 6E:
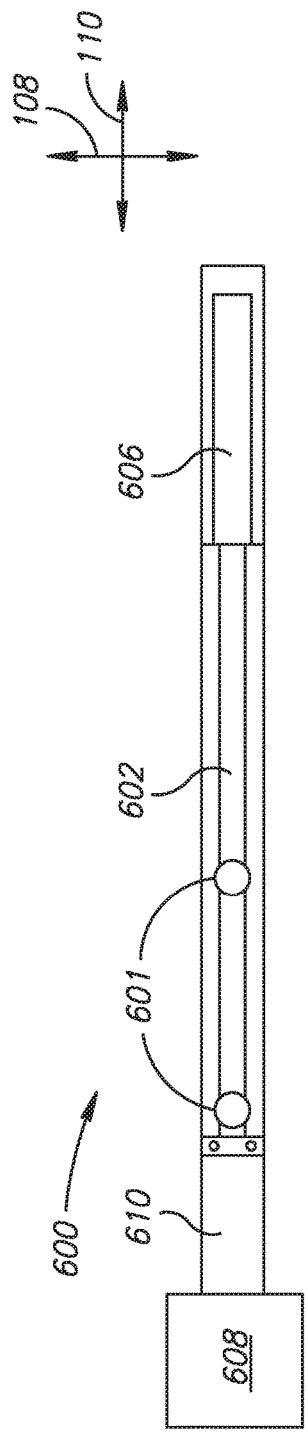
Figure 6F:
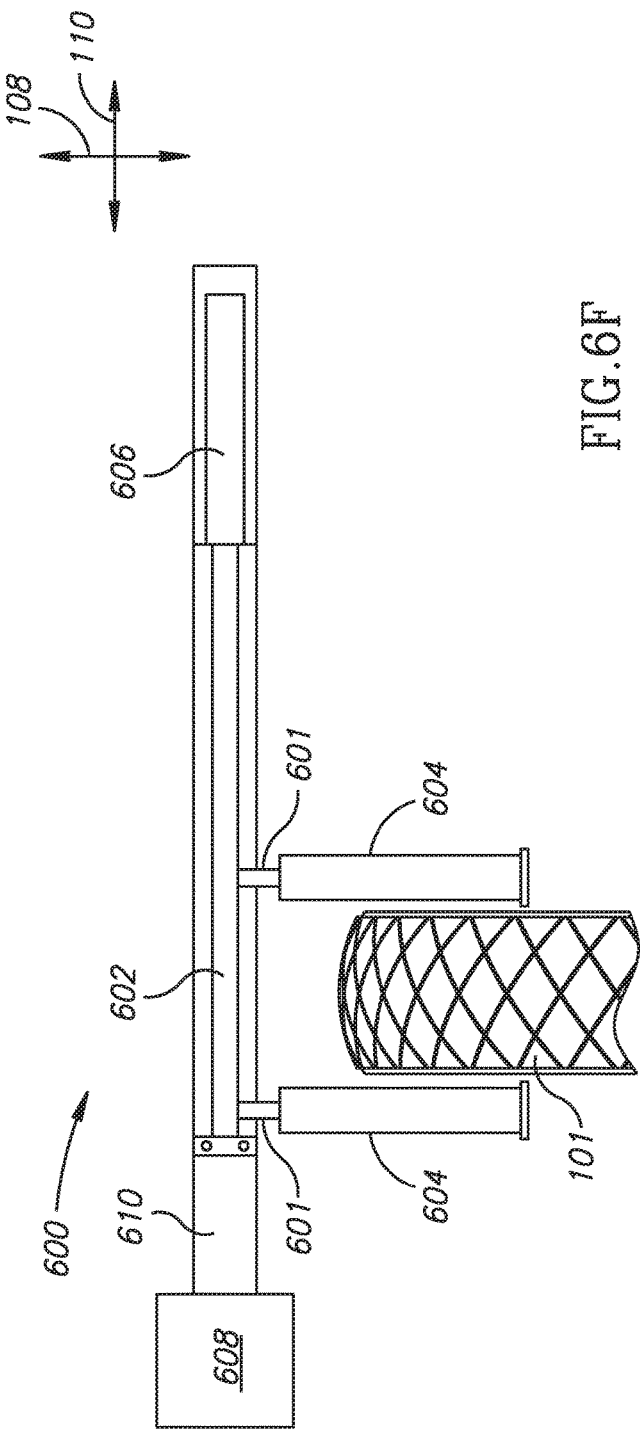

In order to move a tire in the horizontal direction 12 from a longitudinal position $j=j_1$ to an adjacent location $j=j_2$, the pivoting actuator 608 for a location $P(i,j_2,k)$ pivots the arms 601 upward and out of the way (see FIG. 6A). Alternatively, the horizontal actuator 608 for the location $P(i,j_2,k)$ may move the arms 601 horizontally out of the way. The horizontal actuator 606 for location $P(i,j_1,k)$ then moves the arms 601 horizontally to position $j_2$ (see FIGS. 6C and 6D for leftward movement and FIGS. 6E and 6F for rightward movement). The pivoting actuator 608 for location $P(i,j_1,k)$ then moves the arms 601 up and out of the way and slides the arms 601 back to longitudinal position $j_1$. The pivoting actuators 608 for locations $P(i,j_1,k)$ and $P(i,j_2,k)$ may then pivot the arms 601 downwardly such that any tire positioned thereat is located between the arms 601 (see FIG. 6B).

Each nudger 600 may perform one or both of the following functions: (a) to move a spinning tire laterally from a storage position directly under the nudger to an adjacent storage position as described above, and (2) to stabilize the posture of the tire 101 as it is being moved and also when it is at rest. Some tires, because of their tread contours, tend to wobble when they are moving between storage positions and to tip to one side when they stop spinning.

As note above, each tier 401 may include a set of a sensor 408a-408j at each horizontal storage location 406a-406j. FIGS. 7A to 7F illustrate a machine 700 and method of use for injecting electronic chips into a tread of a tire 101.

The machine 700 may include a probe 702 including one or more angled faces 704 that come to sharp point. The probe 702 is preferably strong enough and the faces 704 preferably define a point sharp enough to penetrate the tread of a typical automobile tire. A receptacle 706 is defined in the probe 702 for receiving an electronic chip. In the illustrated embodiment, the receptacle 706 is a pocket extending inwardly perpendicular to one of the faces 704. A channel 708 extends through the probe 702 into fluid communication with the receptacle 706.

The probe 702 may mount to a piston 710 positioned within a cylinder 712. An inlet 714 is in fluid communication with the cylinder 712 for delivering pressurized gas or liquid to the cylinder 712. A post 716 may extend from the piston 710 through an end cap 718 of the cylinder 712. The channel 708 extends through the post 716 to an inlet 720.

In use, an electronic chip 722 is placed within the receptacle 706 (FIG. 7B). The machine 700 is then brought down over a tire 101 (FIG. 7C). Pressurized gas or liquid 724 is input through inlet 714 into the cylinder 712, causing the piston 710 to drive the probe 702 into the tread of the tire 101 (FIG. 7D). Pressurized air or liquid 726 is input to inlet 720, driving the electronic chip 722 out of the receptacle 706 (FIG. 7E). The probe 702 is withdrawn, leaving the electronic chip 722 within the tread of the tire 101 (FIG. 7F). The electronic chip is preferably placed far enough into the tire tread of the tire 101 such that it will not come out but not so far that it interferes with the integrity or strength of the tire 101.

Figure 8:
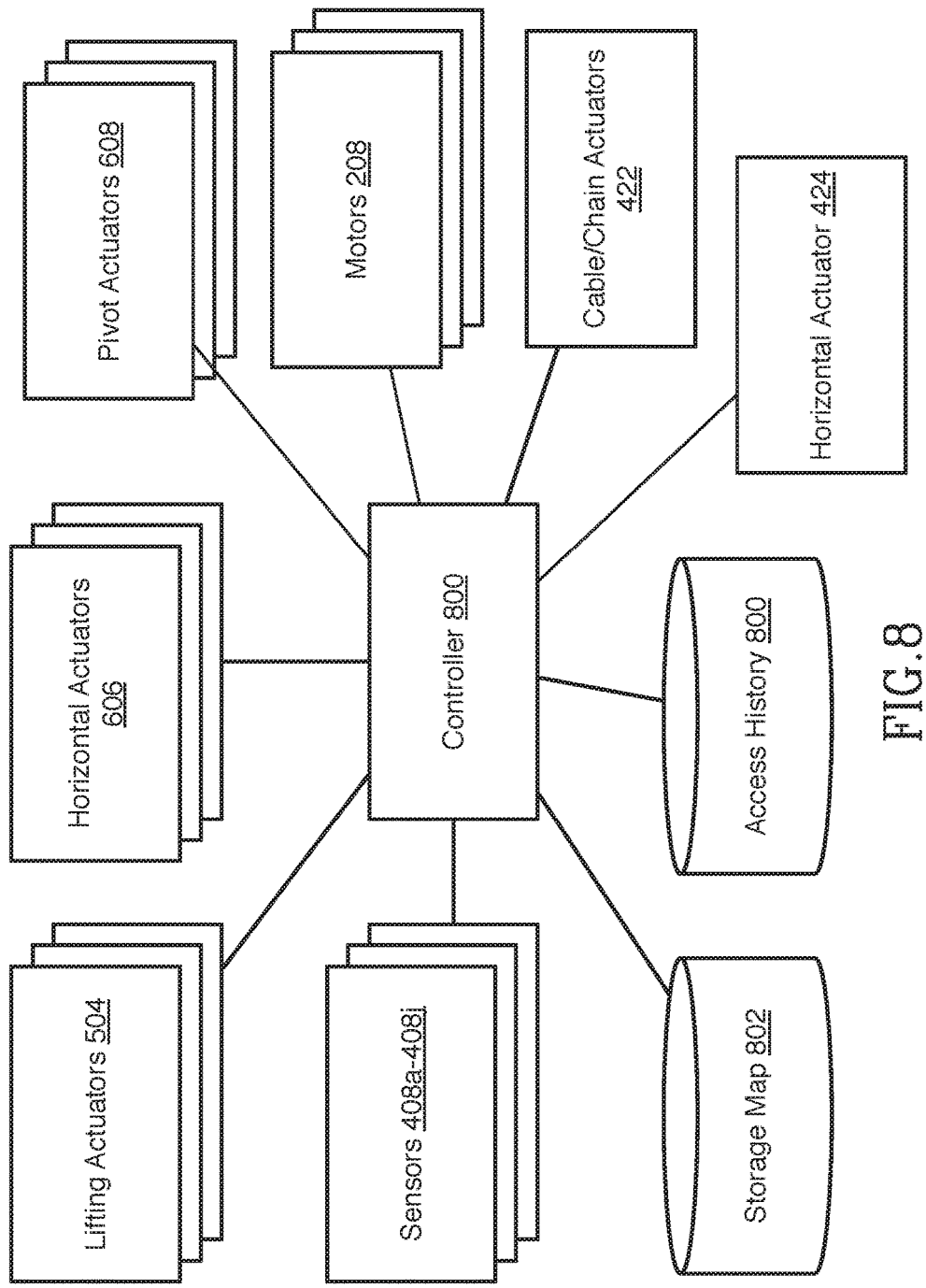
FIG. 8 is a schematic block diagram of components for implementing storage, retrieval, and inventory management using the storage array in accordance with an embodiment of the present invention.

Referring to FIG. 8, a controller 800 embodied as a general purpose computer, programmable logic controller (PLC), a combination of the two, or any other programmable logic device, may be coupled to some or all of the actuators mentioned hereinabove in order to control the storage and retrieval of tires in the storage array and perform other inventory management functions. In embodiments including a general purpose computer 800 as all or part of the controller, the general purpose computer 800 may include one or more processing devices and one or more memory devices coupled to the one or more processing devices, the one or more memory devices storing executable code effective to perform all or part of the storage, retrieval, and inventory management functions ascribed herein to the controller 800.

For example the controller 800 may be operatively coupled to the motors 208, elevator actuators 422, 424, lifting actuators 504, the horizontal actuators 606, and the pivoting actuators 608. The controller 800 may be operable to activate and deactivate these actuators according to any method known in the art according to the type of the actuator (electrical, mechanical, hydraulic, pneumatic). The controller 800 may further be coupled to the sensors 408a-408j such that the input of tires to the storage array may be sensed and processed as described herein. The illustrated components that are shown coupled to the controller 800 may be implemented by coupling the illustrated components to a general purpose computer by way of a PLC.

The controller 800 may further store or access a storage map 802 that maps a tire descriptor to each storage location P(i,j,k) having a tire 101 stored thereat. The controller 800 may further store or access an access history 804 that records when tires are retrieved and or input to the storage array in order to determine what tires are most likely to be retrieved at a given season of the year, i.e. seasonal variation in access frequency as measured in accesses per week, month, or some other time interval. Various storage and retrieval methods and inventory management techniques that may be performed by the controller 800 with respect to the storage array are described below.

A typical tire inventory application may be executed by the controller 800 along with and one or more programs unique to the storage array described above. In particular, these programs may maintain the storage map 802 such that the exact storage location P(i,j,k) of each tire is known. In particular, each time the controller 80 invokes movement of a tire from a first location P(i1,j1,k1) to a second location P(i2,j2,k2), the storage map may be updated to map an identifier or other descriptor of the tire to the second location. In this manner, the storage map 802 records exactly where each individual tire in the storage array is at all times, no matter how many times it has been moved around in the operation of the machine or how long it has been stored in the machine.

The storage array can have many embodiments or configurations, depending on the total desired tire storage capacity of the machine, the ceiling height of the building it is in (and therefore the number of tiers 401a-401c it can have), number and length of roller pairs 402a-402f in the tiers 401a-401c and therefore variations in length and width of the footprint it occupies, placement and number of sensors 408a-408j, etc., but the basic operation does not need to change.

Figures 9A, 9B:
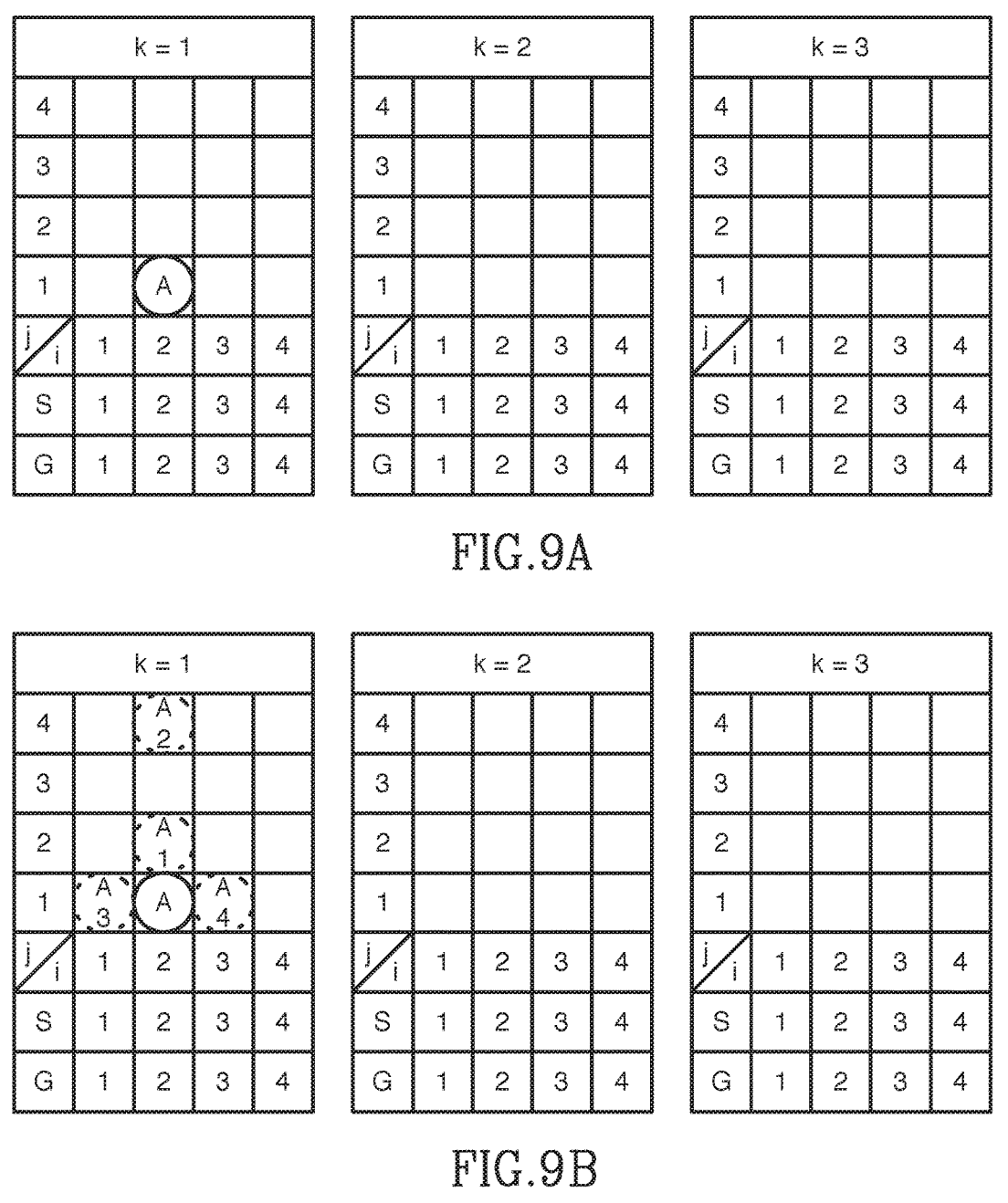

Referring to FIG. 9A, the operation of the storage array may be understood using the concept of rank and file as used in military marching formations. If one stands in front of a military formation in close order with the personnel facing you, the first row of soldiers standing shoulder-to-shoulder is the first rank; the second row is the second rank and so on down to the last row (rank). The individual lines of soldiers lined up front-to-back behind each soldier in the first rank is a file. Files are numbered from left to right. By knowing which rank and file each soldier is in you can pinpoint the exact location of each individual soldier.

As shown in FIG. 9A, the storage array may define files as horizontal locations i=1 to L, L=4 in the illustrated example. Each horizontal location I corresponds to a horizontal location 406a-406j and has all of the attributes of a horizontal storage location described herein including a plate 501 and corresponding actuator 504 and a nudger 600 with corresponding actuators 606 and 608 as described above with respect to FIGS. 5 and 6.

The storage array may define ranks as the longitudinal positions 402a-402f, represented in FIG. 9A as positions j=1 to M, M=4 in the illustrated example. Each longitudinal position includes a pair of rollers 102 and one or more motors 208 for rotating the rollers 102 in either direction as directed by the controller 800, as described above with respect to FIGS. 2A to 2C. Each tier 401a-401c corresponds to a vertical location k=1 to N, where N is 3 in the illustrated embodiment. The values of L, M, and N may be any arbitrary integer depending on footprint and height limitations of a location as well as the storage needs of a location.

In front of the first longitudinal position j=1, indicator lights 410a-410j and sensors 408a-408j are positioned at each horizontal storage location 406a-406j. For simplification, each indicator light is listed in the row labeled "G", and each sensor is listed in the row labeled "S" in FIG. 9A. In some embodiments, each indicator light G=1 to L may be activated to emit green or red light. Using the storage map, the controller 80 may identify each empty location P(i,j,k) in the storage array. In response, the controller 800 causes the indicator light G=i to glow green if there is at least one open position at any of the longitudinal positions at that horizontal location i. The controller 800 causes the indicator light G=i at a particular horizontal location i to glow red if there are no open positions at that particular horizontal location i.

A tire is loaded into a horizontal location i at longitudinal position j=1 at the front edge of the tier k corresponding to the empty position P(i,j,k). When loading the machine, the rollers 102 of the longitudinal position j=1 are caused to rotate by the controller 800 (the top most portion moving away from the center of the storage array), which causes a tire 101 resting thereon to spin rearward, toward the rear of the storage array (j=M). At that point, the sensor S=i reads the identifying information for that tire 101 and transmits that information, to the controller 800, along with the exact horizontal location i of the tire in the first longitudinal position j. The controller 800 uses this information to updated an inventory and storage map.

Referring specifically to FIG. 9A, suppose the storage map 802 indicates an empty position is available in one of the longitudinal positions j at horizontal location i=2 of tier k=1. The indicator light G=2 is therefore caused to glow green. A tire A is loaded at horizontal position i=2 of vertical location k=1. A description of tire A corresponding to the data retrieved by sensor S=2 of vertical location k=1 will be mapped to the location P(2, 1, 1) in the storage map 802. An inventory record may also be updated to indicate that one more unit of the model of tire corresponding to the tire 101 is available in the storage array.

Referring to FIG. 9B, from the initial position it was loaded into, the tire A can be moved to any position in the storage by nudging it sideways to any position in its current longitudinal position j using the nudger 600 at the tire's A current location P(i,j,k) (P(2,1,1) in the illustrated example). The tire A may be moved rearwardly to the second or other longitudinal positions 402b-402f by raising the plate 501 at its current location P(2,1,1), provided the rollers 102 at its current location are spinning forward (top surface moving toward the front edge of the storage array).

For example, raising only the plate 501 under the tire A in location P(2,1,1) will send the spinning tire A to the second longitudinal position j=2 (position P(2,2,1), where it will settle between the rollers 102 of longitudinal position j=2 (see A1 in FIG. 9B). Raising all the plates 501 at a particular horizontal location i for all longitudinal storage locations j, except the last longitudinal position j=M, will send the tire A rolling to the last longitudinal position P(2,4,1) as shown in FIG. 9B (see A2). Of course, by raising, two, three, or some other number of contiguous plates 501, the tire A may be moved rearward or forward by a corresponding two, three, or some other number of longitudinal positions j. By moving the nudgers 600 at location P(2,1,1) side to side, tire A may be moved to position P(3,1,1) or P(1,1,1) (see A3 and A4).

By raising the appropriate plates 501 and activating the nudgers 600, any individual tire in any position P(i1,j1,k1) can be sent to any other position P(i2,j2,k2), provided the adjacent horizontal or longitudinal locations are not currently occupied by another tire.

For example, if the rollers 102 of the longitudinal storage locations j=1 to M are rotating rearward, toward the rear of the machine, tires resting thereon will be rotating forward toward the first longitudinal position j=1. Raising of the plates 501 at one or more locations P(i,j,k) will therefore cause tires to roll forward a corresponding one or more locations toward the front edge of the storage array. Thus, any tire in the storage array can be moved to any position in the first longitudinal position j=1 for unloading.

Figures 9C, 9D:
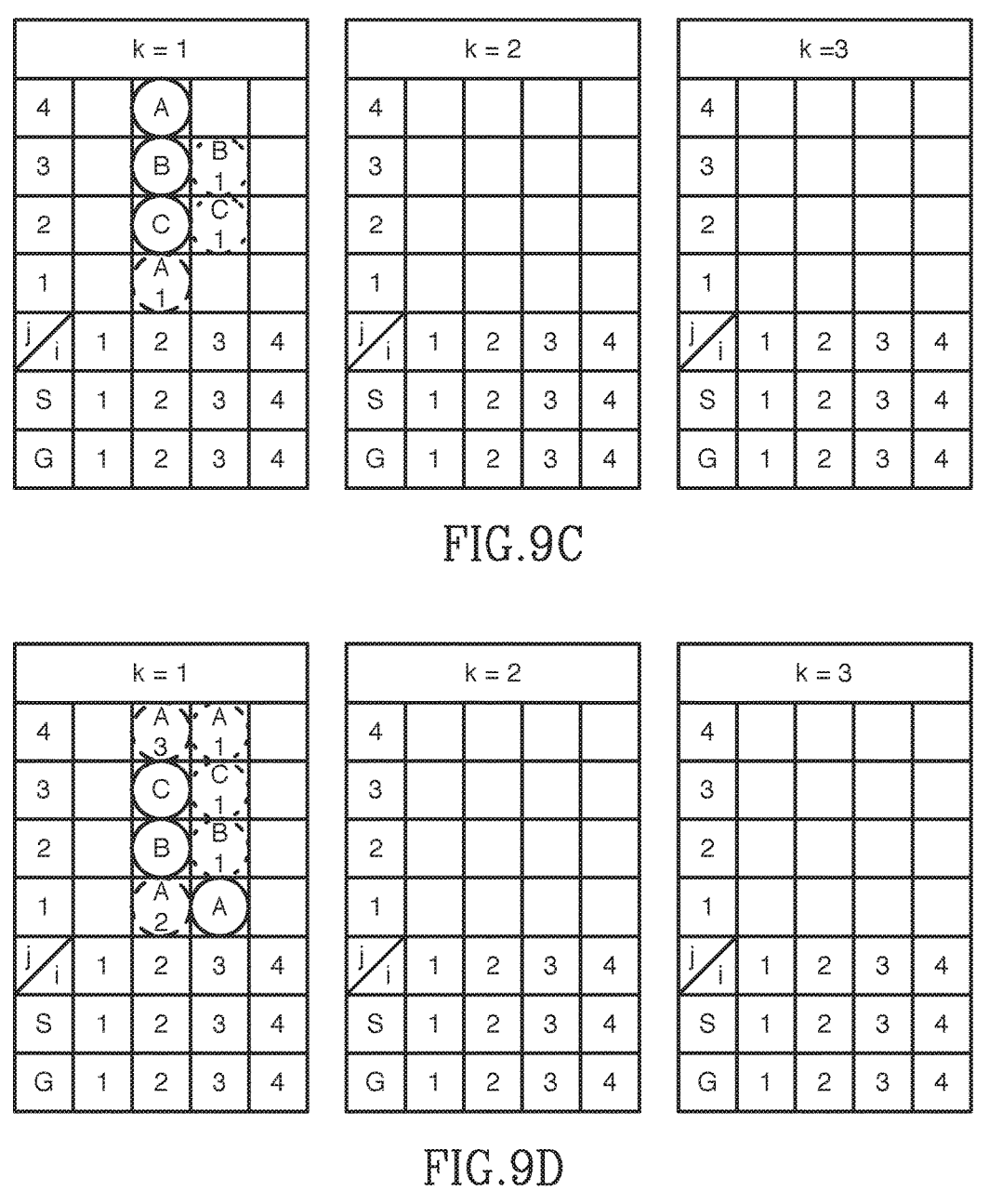

Referring to FIG. 9C, moving a tire in any direction in the storage array obviously assumes that there is an empty position available to move it into. In theory, any tire in any position within a particular tier k could be moved to any other position in the tier k by appropriate movement of rollers 102, nudgers 600, and plates 501, provided there were at least one position in a tier k that is not occupied by a tire. In practice, each tier k may be loaded such that there is at least one empty horizontal location i at each longitudinal position j. In this manner, any tire at any location in a tier k may be provided a "clear shot" to or from any longitudinal position j>1 in the tier k to or from any position in the first longitudinal position j=1 by causing the nudgers 600 to move any tires between that tire's 101 current and desired position out of the horizontal location 406a-406j of that tire. In this manner, the movement of a tire 101 between longitudinal positions 402a-402f is only required when the tire 101 is being loaded or unloaded.

For example, in the example of FIG. 9C, in order to move tire A from position P(2,4,1) to position P(2,1,1), the controller invokes the nudgers 600 to move tire B from position P(2,3,1) to position P(3,3,1) (see B1) and tire C from position P(2,2,1) to position P(3,2,1) (see C1). The plates 501 at locations P(2,4,1), P(2,3,1), and P(2,2,1) may be raised while the rollers 102 at longitudinal positions j=2 through 4 are spinning rearwardly. Tire A will then be caused and allowed to roll forward to location P(2,1,1) where it may be unloaded or loaded onto the elevator 412.

As noted above, the storage map 802 is updated by the controller 800 in response to each movement of each tire A, B, C to store the current location P(i,j,k) of each tire A,B,C such that the location of each tire A, B, C within the storage array is known at all times. The storage array therefore enables the retrieval of any tire at any time in a matter of seconds.

The controller 800 may update an inventory database every time a tire goes into or out of the storage array in response to information picked up by the sensors S=1 to L at the first longitudinal position j=1. Note that reading of the tire data when the tire goes out of the machine is a redundant safety feature since the controller 800 invokes movement of the tire out of the storage array and therefore is aware of its removal even without an output of one of the sensors S=1 to L.

In the event the data in the storage map 802 is lost, the controller 800 may move each tire at least temporarily to a horizontal storage location i=1 to L to the first longitudinal position j=1 using the method illustrated above with respect to the tire A of FIG. 9C. In this manner the sensors S=1 to L may sense the electronic chips therein and update the storage map 802 accordingly. Although this is time-consuming, it is completely automatic, not requiring any human action except, in some embodiments, initiating execution of this procedure. The same procedure used to restore a lost storage map 802 may also be used to verify the contents of the storage array to satisfy the requirements of lenders and accountants for periodic physical inventory counts.

Variations and additions to the programs executed by the controller 800 may also be used in order to, for example, analyze sales and the number of "turns" (e.g., removed for a sale and replaced with a new instance of the same type of tire) of each tire size over time and position the tires that sell the fastest (get the most "turns" per unit of time) towards the front ranks of the machine so that they can be retrieved more quickly than tires having sizes that have turns less frequently.

In addition, the combination of the mechanical components of the storage array and the controller 800 enable various modifications to improve operation. For example, as noted above, some tire sizes and tread contours tend to wobble and/or move side to side within the shallow "Vs" 201 of the rollers 102 at each longitudinal position j. However, this wobble may not be present at some rotation speeds. The controller 800 may sense the wobbling of tires, such as by sensing force exerted on the arms 601 of a nudger 600 at a particular storage location P(i,j,k). The controller 800 may therefore determine (e.g., by adjusting the speed and measuring corresponding wobbling) a range of acceptable rotation speeds for each tire in each position. Accordingly, when a particular tire is moved from longitudinal positions j=j1 to longitudinal position j2 or from a horizontal location i=i1 to another horizontal location i=i2, the controller 800 may cause the rollers 102 engaging the particular tire to rotate within the range of acceptable rotational speeds for that tire. Similarly, if a spinning tire is to be moved only one longitudinal position j forward or back, the tire doesn't require as much initial rotational speed as it would if it were moving seven ranks, for example. The controller 800 may therefore cause the rollers 102 engaging the tire to spin at a speed sufficient to give the tire sufficient kinetic energy to move a desired number of longitudinal positions 402a-402f, the amount of kinetic energy increasing with the number of longitudinal positions over which the tire is to be moved.

Referring to FIG. 9D, to load the machine, the controller 800 may invoke display of a "load new tire inventory" interface on a display device. The controller 800 may invoke rotation of the rollers 102 in the first longitudinal position j=1 of tier k=1 (the lowest tier) to start rotating forward (so that any tires on the first rank roller pairs will spin backward). All the plates 501 in the tier k=1 are moved to, or left in, their lowered position (as shown in FIG. 5B).

The operator then rolls a new tire A onto any horizontal location i of the first longitudinal position j=1 that has a green-glowing indicator light G=I, position P(3,1,1) in the example of FIG. 9. The controller 800 then automatically performs subsequent movement of the new tire (or tires) without any further human input required. The newly loaded tire A immediately starts spinning backward due to rotation of the rollers 102 in the first longitudinal position j=1 and the sensor S=i at the horizontal location i of the newly loaded tire reads the tire identification data from an electronic chip in the tire and transmits that information to the controller 800 (sensor S=3 in the illustrated example).

The controller 800 may then leave the newly loaded tire A at its current position (P(3,1,1) or determine a new storage location for the newly loaded tire. For example, the controller 800 may cause the loaded tire to be moved longitudinally but be stored in the same horizontal location i to which it was initially loaded. For example, tire A may be moved to position P(3,4,1) in the example of FIG. 9D (see A1). In some instances, the controller 800 may directs the appropriate nudgers 600 and plates 501 of one or more positions P(i,j,k) and rollers 102 of appropriate longitudinal positions j to move the newly stored tire to a new location, as well as move any intervening tires longitudinally or laterally in order to open a clear path from the first longitudinal location 402a to the new longitudinal and/or horizontal location for the newly loaded tire.

For example, as shown in FIG. 9D, to move tire A to position P(2,4,1), the rollers of position j=1 may be caused by the controller 800 to spin forward. The nudger 600 of position P(3,1,1) is caused by the controller 800 to move tire A to position P(2,1,1) (see A2). The controller 800 causes the rods 102 at longitudinal positions j=3 and 2 to spin forward. The nudgers 600 at positions P(2,2,1) and P(2,3,1) are caused by the controller 800 to urge tires B and C to move to positions P(3,2,1) and P(3,3,1) (see C1 and B1), respectively. The plates 501 at position P(2,1,1), P(2,2,1), and P(2,3,1) are raised thereby causing tire A to roll to position P(2,4,1) and settle there (see A3).

As noted above, each movement of each tire is recorded by the controller and used to update the storage map 802, including information corresponding to the newly loaded tire A corresponding to the output of the sensor S=3 that sensed the tire A upon loading. For example, an identifier or other descriptor of the newly loaded tire A may be retrieved using data sensed by the sensor S=3 and stored in the storage map as corresponding to the storage location of the newly loaded tire To retrieve tire(s) from inventory, an operator may input a tire identifier, or select a tire identifier within a "retrieve tires from inventory" interface displayed by the controller 800 on the display device. The operator may, for example, input a quantity and description of the tire(s) to be retrieved. The controller 800 maps each descriptor to a storage location using the storage map 802 and invokes movement of the tire at that storage location to the first longitudinal position 402a.

For example, for a tire to be retrieved ("the desired tire") from a position P(i1, j1, k1), the controller 800 may invoke horizontal movement of any tires located at the first longitudinal position j=1 or any intervening longitudinal position 1<j<j1 that are at the same horizontal location i1, thereby opening a clear path for the desired tire to arrive at the first longitudinal position j=1 and possibly move out of the first longitudinal position 402a onto the elevator deck 412. The controller 800 may therefore also invoke horizontal and or vertical movement of the elevator deck 412 to be located at vertical position k1 and horizontal position i1. In response to each of these movements of the desired tire and any intervening tires, the controller 800 updates the storage map 802 to reflect removal of the desired tire and the new locations of any intervening tires that were moved. The controller 800 may further update an inventory database to reflect removal of the desired tire and may invoke preparation of documents such as an invoice for one or more desired tires removed from the inventory information, a restocking order, and other forms for documenting or instructing inventory management tasks.

In a typical installation, three or four tiers k=1 to 3 or k=1 to 4 are disposed on top of each other to conserve floor space, though any other number of tiers may be used depending on height constraints. Accordingly, for multi-tier embodiments, the storage map 802 records both the position of individual tires within a tier k as well as the tier k on which the tire is located. Accordingly, in response to an instruction to retrieve a tire, the tier k on which the tire is located is determined from the storage map 802 and the nudgers 600, plates 501, and rods 102 of that tier k are activated in the manner described above to bring that tire to the first longitudinal position j=1 of that tier k and possibly from the first longitudinal position j=1 onto the elevator deck 412. Likewise, movement of the elevator deck 412 to be longitudinally and vertically aligned with that tier k may be invoked by the controller as well as any lowering of the elevator deck 412 to permit retrieval of the tire.

Figures 9E, 9F:
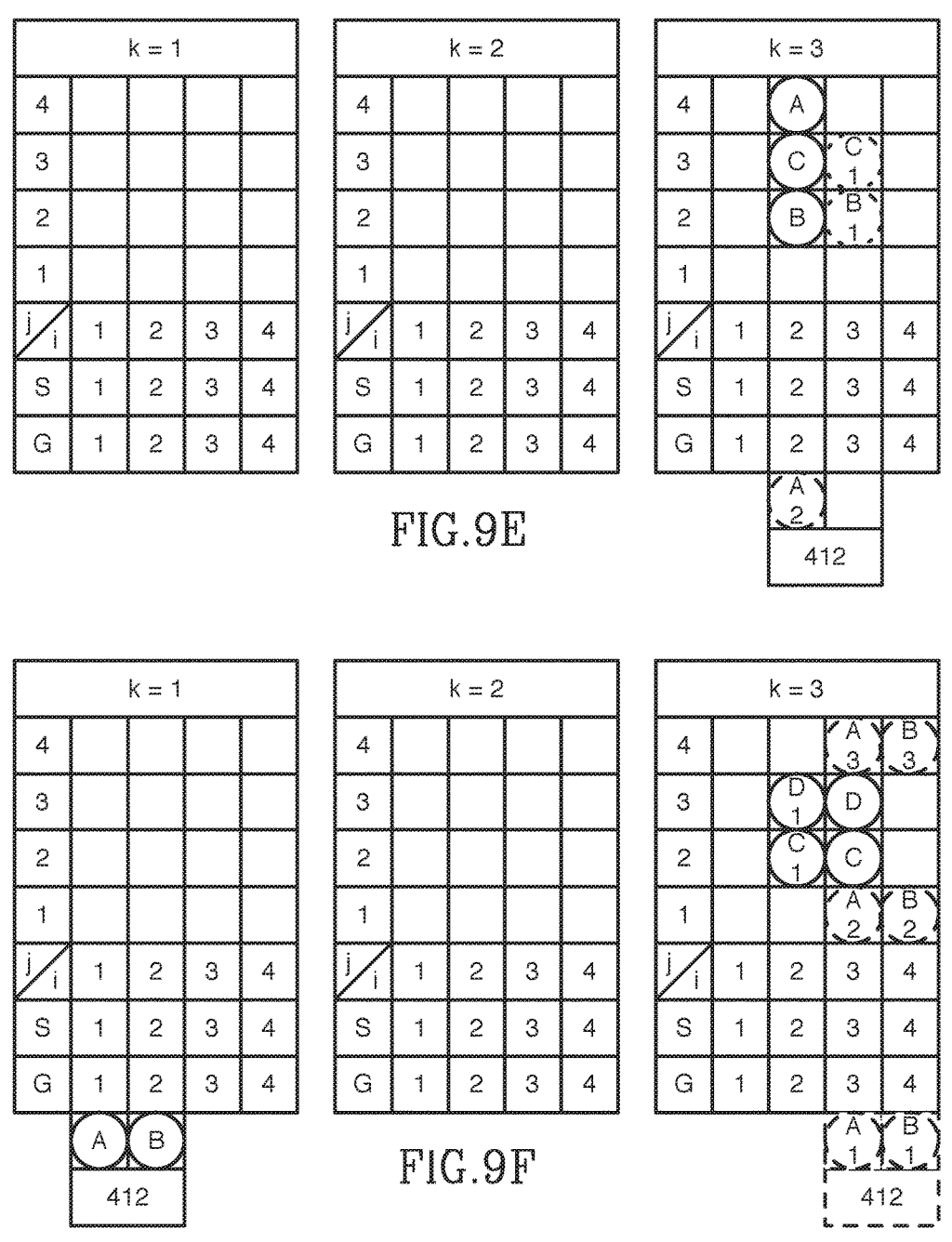

An example of inventory retrieval is shown in FIG. 9E, the desired tire is tire A at position P(2,4,3). The controller therefore invokes movement of the elevator deck 412 such as one of the storage locations of the elevator deck 412 is aligned horizontally and vertically with horizontal location i=2 of tier k=3. The controller 800 therefore invokes rearward spinning of the rollers 102 at longitudinal positions 1 through 4 of tier k=3. The controller 800 then causes the nudgers 600 at positions P(2,3,3) and P(2,2,3) to move tires B and C to positions P(3,3,3) and P(3,2,3), respectively (see C1 and B1). The controller 800 then causes the plates 501 at positions P(2,4,3), P(2,3,3), P(2,2,3), and P(2,1,3) to rise, thereby causing the tire A to roll onto the elevator deck 412 (see A2). For tires on the lowest tier, the controller 800 may simply cause the desired tire to roll to the first longitudinal position j=1, rather than onto the elevator 412. Where the tire A is on a tier other than tier k=1, the elevator 412 may lower the tire A to at or near the vertical level of the tier k=1 for retrieval subsequent to rolling of the tire A onto the elevator deck 412.

In one exemplary embodiment, a storage array is housed in a building with a ceiling height of twelve feet, which limits the machine to three tiers k=1 to 3, for example. Each tier k has some or all of the attributes of the tier 401 described hereinabove. In one example, each tier k defines eight longitudinal positions j=1 to 8, each having the same attributes of the longitudinal storage locations 402a-402f described above. Each tier k may further define ten horizontal storage locations i=1 to 10. Each tier k=1 to 3 therefore, has 80 tire storage locations. The three tiers k=1 to 3 together therefore provide 240 total tire storage spaces. For efficiency of operation, one empty space should be left in each longitudinal location j, reducing the total practical capacity of the storage array to about 210 tires.

Assuming that the storage array is designed for tires with a maximum diameter of 31 inches and a maximum width of 10 inches and allowing for additional mechanical components and framework around the edges of each tier k, each tier k and therefore the footprint of the storage array is about 12 feet by 22 feet or 244 square feet to store 210 tires. This is a phenomenally small 1.25 square feet per tire of floor space for a storage array that stores and instantly stocks, retrieves and inventories tires.

In this example embodiment, the storage array is loaded and unloaded from the front edge adjacent to the first longitudinal location j=0 of tires. Access is only necessary from that side. The other three sides can be up against walls, other machines, other parts of the store, etc. In some embodiments, the controller 800 includes a computer screen with a stand-alone console with a display and keyboard that are connected to the various actuators of the storage array by a flexible cable. In some embodiments, the apparatus 700 for inserting the identifying electronic chips 722 into the tires (FIG. 7A) is also a stand-alone machine. However, one or both of these components (screen/keyboard and/or electronic chip inserter) could be incorporated into the body of the storage array or be on a separate desk or workbench without changing the functions of these components or the storage array.

Referring to FIG. 9F, when receiving a shipment of tires, the elevator deck 412 is loaded by rolling one or more tires A, B onto horizontal storage locations (e.g., V pairs 201) in the roller pair 416 on the elevator deck 412, which are forward (top surface toward rear of the storage array). The one or more tires A, B will then start spinning toward the rear edge of the storage array. The elevator deck 412, controlled by the controller 800, then rises to the tier k that is to receive the one or more tires A, B. In the illustrated example, the tires A, B are loaded onto the elevator deck 412 at the level of tier k=1, which then moves the tires A, B to tier k=3 (see A1, B1). The controller 800 causes the elevator deck 412 to stop with the elevator deck at the same level as the desired tier (k=3 in this example) and invokes any horizontal movement necessary to move the elevator deck to a target horizontal location(s) that of the first longitudinal position that is to receive the tire(s). For example, in FIG. 9F, the elevator moves from being aligned with horizontal locations i=1 and 2 of tier k=1 to being aligned with horizontal locations i=3 and 4 of tier k=3. The controller 800 invokes lifting of one or both of the plates 501 in elevator deck 412, which kicks one or both of the spinning tires A, B out onto the selected horizontal locations (i=3, and 4 in this example, see A2 and B2) of the first longitudinal position j=1. Inasmuch as there may be multiple tires on the elevator deck 412, this process may be repeated for each tire, i.e. the elevator will be moved to a horizontal and vertical position for each tire. For example, tire A may be kicked out at horizontal location i=1 or 2, rather than being immediately adjacent the horizontal location i=4 of tire B.

The controller 800 causes the rods 102 of the longitudinal positions j between the newly loaded tires position and its final position to spin. The controller 800 further causes a portion of the nudgers 600 to move any tires located in a final storage position of the tire and any intervening tires in order to provide a "clear shot" from the front longitudinal position to the final storage position. Alternatively, the newly loaded tire may be shifted to a different horizontal position i in order to have a "clear shot" to another longitudinal position j>1. For example, tires C and D may be moved from positions P(3,2,3) and P(3,3,3) in order to allow tire A to move from position P(3,1,3) to position P(3,4,3) (see A3). All the plates 501 located at the horizontal location i of the final storage location (i=3 in the illustrated example) that are located between the front longitudinal position and the final storage position (P(3,2,3) and P(3,3,3) in the illustrated example) will be caused to rise by the controller 800, except the plate 501 in the final storage position (P(3,4,3) in the illustrated example). The rollers 102 at the longitudinal position of the final storage position (j=4 in the illustrated example) will be caused to spin by the controller 800 prior to arrival of the tire at the final storage position such that the spinning tire settles into the final storage position.

This process may be repeated sequentially for each tire A, B simultaneously moved by the elevator 412 inasmuch as there may be only one empty horizontal location i per longitudinal position j, such that only one "clear shot" may be created at a time. Accordingly, following moving of tire A to position P(3,4,3), one or more tires may be moved out of the way to provide a clear shot for tire B to arrive at position P(4,4,3) in the illustrated example (see B3)

Removing a tire from inventory reverses the process of FIG. 9F. For example, an operator may select "retrieve tire from inventory" on the interface displayed by the controller 800 on the display device. The interface then displays "select tire(s) to be removed." The operator can then scroll down a list of the stored tires and select one or more desired tires. An operator may also input a tire size, model and quantity rather than selecting an identifier of an individual tire. In either case, the storage array, through the operation of the rollers 102, nudgers 600, plates 501, and elevator, delivers the tires ordered to either the first longitudinal position j=1 of the lowest tier k=1 or, if the tires ordered were stored on tiers k>1, to the elevator deck 412, which descends to floor level with the desired tires.

The indicator lights G=1 to L at each horizontal position i=1 to L on the lowest tier k=1 having a desired tire located thereon are then caused by the controller 800 to blink green, indicating that the tire located at the first longitudinal position is ready to be retrieved. The operator then removes the tires manually from the first longitudinal position j=1 of the lowest tier k=1 or the elevator or plates 501 under the selected tires can rise and kick them out to the area in front of the storage array. The sensors S=1 to L on the lowest tier k=1 and on the elevator deck 412 verify that the tires have been removed, i.e. are no longer sensed, and the controller 800 adjusts the storage map 802 and its inventory records accordingly.

The removal of a tire A from inventory may be understood using the reverse of the example of FIG. 9F. The elevator 412 is loaded by causing, by the controller 800, its roller pair 416 to spin towards the rear of the storage array and its plate 501 to move or remain lowered. The elevator 412 is caused by the controller 800 to move horizontally and/or vertically to be located in front of the horizontal location i of the tier k containing the tire to be removed. (tier k=3 and horizontal location i=2 in the illustrated example). The rollers 102 on that tier k at the longitudinal position j containing the tire to be removed (j=4 for tires A and B (see A3, B3)) and all longitudinal positions from there up to and including the first longitudinal position j=1 (longitudinal positions j=1 to 4 in the example of FIG. 9F), are caused, by the controller 800, to start rotating towards the rear of the storage array and the tires on those roller pairs therefore start spinning toward the front of the storage array.

Nudgers 600 create a "clear shot" from the tire to be removed to the elevator deck 412 as described above. Additionally, or alternatively, the tire to be removed may be shifted horizontally to a different horizontal position I that has a clear shot to the elevator deck 412. For example, if tires C and D were located at positions P(3,2,3) and P(3,3,3) as shown, they may be moved to positions P(2,2,3) and P(2,3,3) (see D1 and C1) to allow tire A to roll forward to longitudinal position j=1. The plates 501 are caused by the controller 800 to rise under the tire to be removed and at the same horizontal location at each longitudinal position between it and the elevator deck 412. In the illustrated embodiment to move the tire A from position P(3,4,3) (A3) to P(3,1,3) (A2), the plates 501 may be raised at positions P(3,4,3), P(3,3,3), P(3,2,3), and P(3,1,3). This causes the tire to be kicked out onto the elevator deck 412 where it settles into the "V" pairs in the elevator's spinning roller pair 416. The elevator deck 412 may move vertically and possibly horizontally to convey the tire A to the level of tier k=1. As noted above, the storage map 802 is updated in response to the movement of each tire, including the removal thereof.

The controller 800 may store or access an inventory management application that maintains a "stocking/retrieving priority list" based on past stocking and retrieving activity. This list will have ranked each tire size and model that had ever been stocked from most likely to least likely to be moved into or out of the machine at any time. Accordingly, for any particular time of year, the frequency of access for each particular model and type of tire may be calculated and each tire may be assigned a priority according to its frequency of access, with higher priority tires having a higher corresponding frequency of access. For example, snow and studded tires would have a higher frequency of access in winter months, recreational vehicle and trailer tires would be more frequently accessed in the summer months, etc. Accordingly, tires with a higher frequency of access at a particular time of year would be moved by the controller 800 at that time of the year toward the front of the storage array than those with a lower frequency of access at that time of the year.

In another example, a shipment of tires is received, each tire of which includes an embedded electronic chip identifying the tire. Likewise, an electronic record exists including descriptors of each tire and mapping the descriptor to an identifier of the electronic chip embedded in the tire. The electronic record may further include quantities and specifications of the shipment of tires to be loaded. The electronic record may be recorded on a computer readable medium accompanying the shipment or received by some other means.

The controller 800 may then access the electronic record, such as by loading the electronic record into the memory of the controller 800. The controller may prioritize the tires based on the "stocking/retrieving priority list." Therefore, the controller 800 may select a target location from among empty storage locations in the storage array for each tire in the shipment based on its priority, with low priority tires located closer to the rear of the storage array than higher priority tires. Tires present in the storage array prior to the shipment may be moved in response to the shipment in order to conform to a desired arrangement of higher priority tires closer to the front than low priority tires. The controller 800 may then output loading directions to a human operator indicating an ordering in which tires from the shipment are to be loaded.

In simple terms, the basis for the loading directions as calculated by the controller 800 will have been based on the fact that loading and unloading tires from the front rank on the lowest roller deck uses the least power and time and puts the least wear and tear on the machine. Conversely, loading and unloading tires from the rear longitudinal position of the uppermost tier 401c takes the most power, time, and wear and tear. Therefore, tires which are projected to have the most frequent "turns" will be loaded onto the lower roller decks and those with the least "turns" will go to the rearmost ranks on the uppermost roller deck.

Figure 10A:
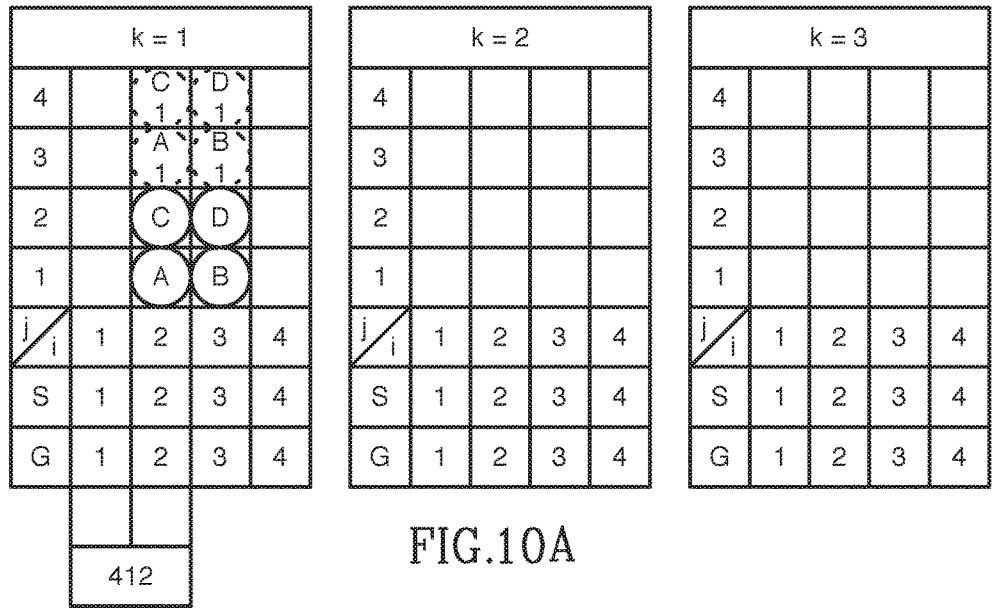
FIGS. 10A and 10B are schematic block diagrams illustrating the loading of a shipment in accordance with an embodiment of the present invention.

Referring to FIG. 10A, to start the loading process, the operator selects "load new tire inventory" interface element on the display coupled to the controller 800. At that point, all the rollers 102 in all the longitudinal positions on all the tiers k=1 to 3 that have empty horizontal locations in them are caused, by the controller 800, to spin forward, which makes the tires on them spin toward the rear of the storage array. Through the operation of the plates 501, all the tires currently stored on all the tiers 401a-401c are then caused by the controller 800 to move to the rearmost empty storage positions, while leaving at least one empty horizontal location i for each longitudinal position j<M, leaving the front storage positions open. For example, as shown in FIG. 10A, tires A, B, C, and D are moved back from longitudinal positions j=1 and 2 to longitudinal positions j=2 and 3 (see A1, B1, C1, and D1).

Figure 10B:
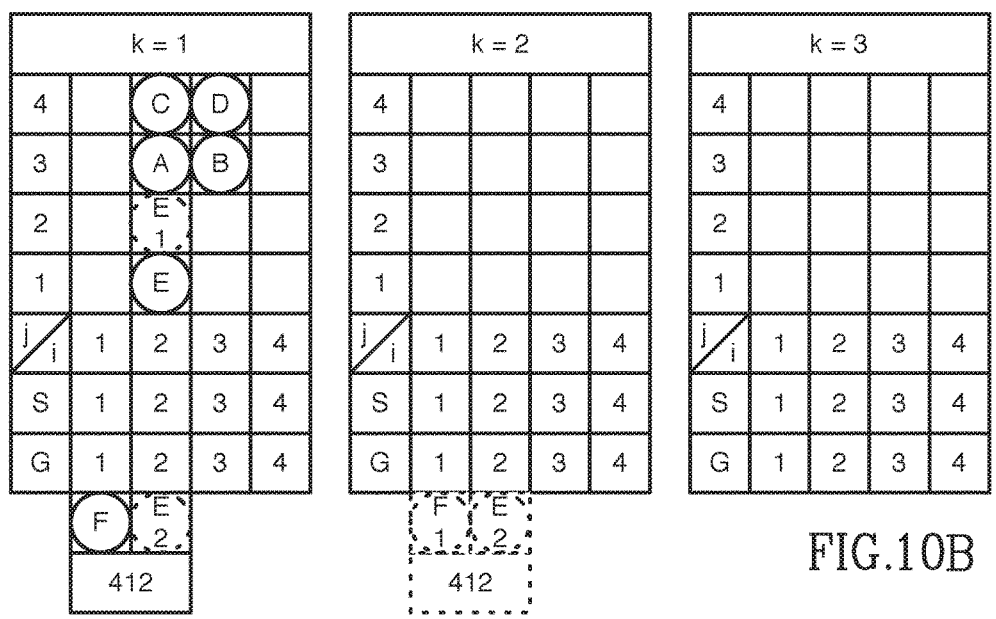

Referring to FIG. 10B, the interface on the display then instructs "begin loading tires." Green indicator lights G=1 to L then turn on over each horizontal position i=1 to L that has one or more empty storage positions in any longitudinal position behind the first longitudinal position on the floor-level tier 401a. For example, for tier k=1, all the lights G=1 to 4 will glow green. The operator then rolls a tire from the shipment onto any first longitudinal position storage position having a corresponding green indicator light G. In the example of FIG. 10B, the operator places tire E at position P(2,1,1). The sensor S at that horizontal position then reads identifying tire information from the electronic chip in the tire and sends it to the controller 800 which, through the operation of the plates 501, sends the tire to the rearmost empty storage position in the horizontal location which it is in if the controller determines that the tire is supposed to be stored on the tier k=1. The controller then records the tires final position in the storage map 802. In the illustrated example, sensor S=2 senses an electronic chip in the tire E and the controller 800 invokes movement of the tire E to the most rear ward longitudinal position, j, at the horizontal position i of the tire, which is position P(2,2,1) (see E1). As noted above, the intended tier k for a tire may be determined according to a frequency of removal of tires having the attributes of the tire (e.g., some or all of the type, model, and brand of the tire) such that more frequently removed tires are located on lower tiers k than less frequently removed tires.

If the target location for a tire is determined by the controller 800 to be a second, third, or higher tier k>1, the indicator light G at the horizontal location of the tire just loaded changes from green to blinking red. In the illustrated example, if the tire E is determined by the controller 800 to be intended for tier k=2, for example, light G=2 will blink red. The operator then removes the tire from the first longitudinal position j=1 on the lowest tier k=1 and sets it on the spinning roller pair 416 on the elevator deck 412 (see E2 in the illustrated example).

A sensor on the elevator (e.g., similar in placement and attributes to the sensors 410a-410j), reads the electronic chip of the tire and sends the identifying information to the controller 800, which registers that that particular tire is on a particular "V" pair on the elevator deck 412. When a second tire is "rejected" from the first roller tier, the operator places it on the elevator deck 412, where the chip of the second tire is read by another sensor on the elevator deck 412. In the example, of FIG. 10B, tire F may be initially placed on tier k=1 and then be placed on the elevator deck 12 in the same manner as the tire E.

The controller 800 then directs the elevator actuators 422, 424 to take the tires to whichever horizontal locations i of whichever tier k that the controller has selected for them, based on their frequency of projected "turns," e.g., their position in the "stocking/retrieving priority list." In the illustrated embodiment, the elevator deck 412 takes tires E and F to tier k=2 and horizontal locations k=2 and 1, respectively. The tires E and F may then be unloaded from the elevator deck 412 in the manner described above with respect to FIG. 9F. In this way, the entire truckload of new tires is stocked and added to the storage array's storage map in a relatively short time.

Various modifications of the storage array may be implemented. For example, modular variations may be created, which could then be assembled in a variety of configurations. The capacity and footprint could be large or small, could be wide or narrow, could be loaded and unloaded from both the front or back, could have two tiers or eight tiers, roller pairs 402a-402f could be end-to-end, the elevator deck 412 could hold two or ten tires at a time, the computer operating program could be simple or complex, mechanical functions could be air, hydraulic, electro-mechanical or robotically actuated. In some instances, a tire factory or distribution warehouse could communicate with the controller 800 over a network connection just prior to loading the shipment of tires to be delivered and individual tires in the shipment could have been physically labeled as destined for the "lowest tier" or "elevator," which would eliminate double handling of some tires on delivery.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for managing tire inventory comprising:
   one or more rotators defining a plurality of storage positions, the one or more rotators configured to induce rotation of tires positioned in the plurality of storage positions; and
   at least one actuator configured to engage tires in the plurality of storage position and to move the tires between storage positions of the plurality of storage positions.

2. The system of claim 1, wherein the one or more rotators comprise an indentation configured to urge the tires to remain in the plurality of storage positions.

3. The system of claim 1, wherein the plurality of storage positions comprise a three-dimensional array of storage positions.

4. The system of claim 1, further comprising a controller coupled to the at least one actuator and programmed to selectively activate the at least one actuator effective to move the tires among the plurality of storage positions.

5. The system of claim 1, wherein the at least one actuator comprises:
   one or more first actuators configured to urge the tires between rotators of the one or more rotators; and one or more second actuators configured to urge the tires between storage positions of the plurality of storage positions on a same rotator of the one or more rotators.

6. The system of claim 5, wherein the one or more first actuators are positioned below the one or more rotators.

7. The system of claim 6, wherein the one or more first actuators are configured to rise into frictional engagement with the tires in the plurality of storage positions.

8. The system of claim 7, wherein the one or more first actuators are configured to lift the tires in the plurality of storage positions.

9. The system of claim 5, wherein the one or more second actuators are positioned above the one or more rotators.

10. The system of claim 9, wherein the one or more second actuators include rollers configured to engage the tires when rotating.

11. A method comprising:
  providing one or more rotators defining a plurality of storage positions, the one or more rotators configured to induce rotation of tires positioned in the plurality of storage positions;
  providing at least one actuator configured to engage tires in the plurality of storage position and to move the tires between storage positions of the plurality of storage positions;
  rotating at least one tire of the tires using a rotator of the one or more rotators; and
  while the at least one tire is rotating, moving, using the at least one actuator, the at least one tire at least one of (a) perpendicular to an axis of rotation of the at last one tire and parallel to the axis of rotation.

12. The method of claim 11, wherein the one or more rotators comprise an indentation at each storage position of the plurality of storage positions and configured to urge the tires to remain in the each storage position, the method further comprising, urging, by the at least one actuator, the at least one tire parallel to the axis of rotation and out of the indentation of a storage position of the plurality of storage positions at which the at least one tire is located and into the indentation at an adjacent storage location of the plurality of storage positions.

13. The method of claim 11, further comprising causing the one or more first actuators to lift the at least one tire while the at least one tire is rotating.

14. The method of claim 11, wherein the plurality of storage positions comprise a three-dimensional array of storage positions.

15. The method of claim 11, further comprising invoking moving, by a controller coupled to the at least one actuator, moving of the at least one tire among the plurality of storage positions.

16. The method of claim 11, wherein the at least one actuator comprises:
  one or more first actuators configured to urge the tires between rotators of the one or more rotators; and
  one or more second actuators configured to urge the tires between storage positions of the plurality of storage positions on a same rotator of the one or more rotators;
  wherein the method further comprises urging the at least one tire perpendicular to the axis of rotation using the one or more first actuators and urging the at least one tire parallel to the axis of rotation using the one or more second actuators.

17. The method of claim 16, wherein the one or more first actuators are positioned below the one or more rotators.

18. The method of claim 17, further comprising causing the one or more first actuators to rise into frictional engagement with the at least one tire.

19. The system of claim 11, wherein the one or more second actuators are positioned above the one or more rotators.

20. The method of claim 19, wherein the one or more second actuators include rollers engaging the at least one tire during urging of the at least one tire parallel to the axis of rotation using the one or more second actuators.

* * * * *

UNITED STATES PATENT AND TRADEMARK OFFICE
CERTIFICATE OF CORRECTION

PATENT NO.           : 9,600,799 B1
APPLICATION NO.      : 15/263188
DATED                : March 21, 2017
INVENTOR(S)          : Thomas J. Allen Page 1 of 1

It is certified that error appears in the above-identified patent and that said Letters Patent is hereby corrected as shown below:

In the Claims

In Column 23, Line 23 (Claim 11), "position" should be --positions--.

In Column 23, Line 30 (Claim 11), "last" should be --least--.

Signed and Sealed this
Second Day of May, 2017

Michelle K. Lee
*Director of the United States Patent and Trademark Office*